US012548671B2

(12) United States Patent
Doyen et al.

(10) Patent No.: US 12,548,671 B2
(45) Date of Patent: Feb. 10, 2026

(54) AUTOMATED MACHINE LEARNING SYSTEMS AND METHODS FOR MAPPING BRAIN REGIONS TO CLINICAL OUTCOMES

(71) Applicant: Omniscient Neurotechnology Pty Limited, Sydney (AU)

(72) Inventors: Stephane Philippe Doyen, Mount Kuring Gai (AU); Nhu Dung To, Belmore (AU); Hugh Monro Taylor, Point Piper (AU); Angus William Joyce, Northwood (AU); Michael Edward Sughrue, Brighton Le Sands (AU)

(73) Assignee: Omniscient Neurotechnology Pty Limited, Sydney (AU)

( * ) Notice: Subject to any disclaimer, the term of this patent is extended or adjusted under 35 U.S.C. 154(b) by 430 days.

(21) Appl. No.: 18/109,213

(22) Filed: Feb. 13, 2023

(65) Prior Publication Data
US 2023/0268068 A1    Aug. 24, 2023

Related U.S. Application Data

(60) Provisional application No. 63/311,935, filed on Feb. 18, 2022.

(51) Int. Cl.
*G16H 40/63* (2018.01)
*G06T 7/00* (2017.01)
(Continued)

(52) U.S. Cl.
CPC .......... *G16H 40/63* (2018.01); *G06T 7/0012* (2013.01); *G06T 7/11* (2017.01); *G16H 15/00* (2018.01);
(Continued)

(58) Field of Classification Search
CPC ........ G16H 15/00; G16H 20/40; G16H 30/20; G16H 30/40; G16H 40/63; G16H 40/67;
(Continued)

(56) References Cited

U.S. PATENT DOCUMENTS 11,055,849 B2    7/2021 Sughrue et al.
11,087,877 B1    8/2021 Sughrue et al.
(Continued)

OTHER PUBLICATIONS

Goyal et al., "Development of a Stand-Alone Independent Graphical User Interface for Neurological Disease Prediction with Automated Extraction and Segmentation of Gray and White Matter in Brain MRI Images", Journal of Healthcare Engineering, vol. 2019, Issue 1, Feb. 14, 2019, pp. 1-21 (Year: 2019).*

*Primary Examiner* — Ping Y Hsieh
*Assistant Examiner* — Jose M Torres
(74) *Attorney, Agent, or Firm* — Fish & Richardson P.C.

(57) ABSTRACT

Methods, systems, and apparatus, including computer programs encoded on computer storage media, for selecting automatically a machine learning model that locates region (s) of the brain of a subject that is/are associated with a clinically relevant outcome. One of the methods includes: receiving a brain image dataset of a subject; receiving, from a user, an indication of a patient outcome of interest; selecting, based on the indication of a patient outcome of interest, a model from a plurality of models to produce a selected model; determining brain data of interest for the patient outcome of interest; determining, using the selected model, subject specific brain data of interest based on the brain image dataset of the subject and on the brain data of interest; and taking an action based on the subject specific brain data of interest.

18 Claims, 9 Drawing Sheets

(51) Int. Cl.
  *G06T 7/11* (2017.01)
  *G16H 15/00* (2018.01)
  *G16H 20/40* (2018.01)
  *G16H 30/20* (2018.01)
  *G16H 30/40* (2018.01)
  *G16H 40/67* (2018.01)
  *G16H 50/20* (2018.01)
  *G16H 50/50* (2018.01)
  *G16H 50/70* (2018.01)

(52) U.S. Cl.
  CPC ............. *G16H 20/40* (2018.01); *G16H 30/20* (2018.01); *G16H 30/40* (2018.01); *G16H 40/67* (2018.01); *G16H 50/20* (2018.01); *G16H 50/50* (2018.01); *G16H 50/70* (2018.01); *G06T 2207/30016* (2013.01)

(58) Field of Classification Search
  CPC ........ G16H 50/20; G16H 50/50; G16H 50/70; G06T 7/0012; G06T 7/11; G06T 2207/30016
  See application file for complete search history.

(56) References Cited

U.S. PATENT DOCUMENTS

| | | |
|---|---|---|
| 11,145,119 B2 | 10/2021 | Sughrue et al. |
| 11,315,248 B2 | 4/2022 | Sughrue et al. |
| 11,360,177 B1 | 6/2022 | Sughrue et al. |
| 11,382,514 B1 | 7/2022 | Sughrue et al. |
| 2017/0052241 A1* | 2/2017 | Cetingul .......... G01R 33/56341 |
| 2021/0375480 A1* | 12/2021 | Mahon ................ A61B 5/4064 |
| 2022/0207722 A1* | 6/2022 | Kim ....................... G06T 7/0014 |
| 2023/0154614 A1* | 5/2023 | Pfister ..................... A61B 6/032 705/2 |

* cited by examiner

AUTOMATED MACHINE LEARNING SYSTEMS AND METHODS FOR MAPPING BRAIN REGIONS TO CLINICAL OUTCOMES

CROSS-REFERENCE TO RELATED APPLICATIONS

This application claims the benefit under 35 U.S.C. § 119(e) of the filing date of U.S. Patent Application No. 63/311,935, for Automated Machine Learning Systems and Methods for Mapping Brain Regions to Clinical Outcomes, which was filed on Feb. 18, 2022 and which is incorporated here by reference in its entirety.

BACKGROUND

Technical Field

The present disclosure relates generally to selecting automatically a machine learning model that locates region(s) of the brain of a subject that is/are associated with a clinically relevant outcome. The present disclosure also relates to automatically finding one or more candidate clinically relevant outcomes using a machine learning model when a brain image dataset of a subject is provided. The present invention also relates to a system, method, and apparatus for automatically selecting a machine learning model that locates region(s) of the brain in a subject that maps to a clinically relevant outcome, and to a computer program product including a computer readable medium having recorded thereon a computer program for automatically selecting a machine learning model that locates region(s) of the brain of a subject that maps to a clinically relevant outcome.

Background

Medical images of a brain can provide insights into functional activity and structural connections of a brain. Images generated using imaging techniques such as magnetic resonance imaging (MRI) can be used to provide visual representations of structural and functional data of the brain which can facilitate biomedical research, clinical measurement or analysis, and medical interventions. Medical images taken by different imaging devices can present different format, size, or other information such as diagnosis or disease progression of the same brain region.

SUMMARY

This specification describes technologies for automatically selecting a machine learning model among multiple machine learning models with suitable performance to locate region(s) of the brain that is/are related to a clinically relevant outcome. The specification also describes technologies, when image data of one or more brain regions of a subject is provided, for automatically finding one or more candidate clinical outcomes that are associated with the brain regions using a selected machine learning model. The disclosed technologies can be used by clinicians, other medical professionals, or users without medical expertise to locate conveniently brain regions of a subject that are associated with, or related to, a clinical outcome thereby facilitating more focused subsequent diagnosis, treatment, and/or research focusing on the brain regions. Such information obtained using the subject matter herein enables clinicians, other medical professionals, or users to perform improved and more informed diagnosis, treatments, operations, research, or their combinations than with existing systems.

For example, for certain diseases like Alzheimer's disease, it is important to detect early onset of disease-caused alterations in the structure of the brain. Traditionally, in order to detect early manifestation of Alzheimer's, a subject typically undergoes multiple tests and various imaging sessions, so that a diagnosis can be generated based on the test results and image data. Such traditional methods are time consuming, expensive and burdensome for clinicians and also the subject. The technologies disclosed herein can standardize existing medical images of Alzheimer patients and control subjects, e.g., from different medical institutions, separate their imaging data using classifications (e.g., binary classifications), and use such existing image data and diagnosis to train one or more machine learning models. The trained machine learning models can then be selected to locate brain region(s) that may have caused the early onset of Alzheimer's disease. Such information specifying brain region(s) can be used by medical professionals to prescribe more focused and efficient testing and/or imaging of the subject. As another example, a medical professional may have a patient with some subtle abnormalities in a brain region and want to know what dysfunctions may result from such abnormalities. Information of that brain region may be provided, e.g., brain scans, and the selected machine learning models can map the region to the possible diseases and/or symptoms that are associated with this region.

In general, one innovative aspect of the subject matter described in this specification can be embodied in methods that include the actions of: receiving a brain image dataset of a subject; receiving, from a user, an indication of a patient outcome of interest; selecting, based on the indication of a patient outcome of interest, a model from a plurality of models to produce a selected model; determining brain data of interest for the patient outcome of interest; determining, using the selected model, subject specific brain data of interest based on the brain image dataset of the subject and on the brain data of interest; and taking an action based on the subject specific brain data of interest.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Another innovative aspect of the subject matter described in this specification can be embodied in systems that include: a brain scan standardization engine configured to ingest brain data of interest and standardize the brain data of interest; a brain metadata standardization engine configured to ingest brain metadata assigned to the brain data of interest and convert the brain metadata to a standard form; a model generation engine configured to receive the brain data of interest from the brain scan standardization engine and brain metadata from the brain metadata standardization engine and to generate a plurality of models wherein each model assigns an outcome of interest to the brain data of interest; and a scan engine configured to apply a variety of models to subject specific brain data to identify potential outcomes.

As additional description to the embodiments described below, the present disclosure describes the following embodiments.

Embodiment 1 is a method, comprising: receiving a brain image dataset of a subject; receiving, from a user, an indication of a patient outcome of interest; selecting, based on the indication of a patient outcome of interest, a model from a plurality of models to produce a selected model; determining brain data of interest for the patient outcome of interest; determining, using the selected model, subject specific brain data of interest based on the brain image dataset of the subject and on the brain data of interest; and taking an action based on the subject specific brain data of interest.

Embodiment 2 is the method of embodiment 1, wherein receiving, from the user, the indication of the patient outcome of interest comprises receiving the indication of a medical condition.

Embodiment 3 is the method of embodiment 1 or 2, wherein receiving, from the user, the indication of the patient outcome of interest comprises receiving the indication selected from a group of: studying changes in a condition; addressing a symptom; and predicting response to a specified treatment.

Embodiment 4 is the method of any one of embodiments 1-3, wherein the brain data of interest comprises: parcellation data; brain connectivity data; brain activity data; anomalous connectivity data; or a combination thereof.

Embodiment 5 is the method of any one of embodiments 1-4, wherein determining the subject specific brain data of interest based on the brain image dataset of the subject and on the brain data of interest comprises: locating one or more brain regions of the subject that map to the indication by using the selected model on the brain image dataset of the subject.

Embodiment 6 is the method of any one of embodiments 1-5, wherein the method further comprises generating a standardized brain image dataset based on the brain image dataset of the subject.

Embodiment 7 is the method of any one of embodiments 1-6, wherein the method further comprises standardizing the brain data of interest.

Embodiment 8 is the method of embodiment 7, wherein standardizing the brain data of interest comprises: registering anatomical information of the brain data of interest to a predetermined coordinate system; registering connectivity information of the brain data of interest to the predetermined coordinate system; generating a corresponding brain atlas based on each of the brain data of interest; generating tractography data based on each of the brain data of interest; correcting artifacts in each of the brain data of interest; or a combination thereof.

Embodiment 9 is the method of embodiment 5, wherein locating one or more brain regions of the subject that map to the indication by using the selected model on the brain image dataset of the subject: locating the one or more brain regions that map to the indication by using the selected model on a standardized brain image dataset.

Embodiment 10 is the method of any one of embodiments 1-9, wherein the selected model is trained with the brain data of interest and clinical information associated with the brain data of interest comprising a mapping ground truth that maps one or more training regions to a training indication.

Embodiment 11 is the method of any one of embodiments 1-10, wherein taking the action based on the subject specific brain data of interest comprises forwarding the subject specific brain data of interest to a user's computer for display.

Embodiment 12 is the method of embodiment 11, wherein taking the action based on the subject specific brain data of interest comprises receiving an indication to export at least a portion of the subject specific brain data of interest.

Embodiment 13 is the method of any one of embodiments 1-12, wherein the indication of the patient outcome of interest comprises one or more of: a disease, a symptom, a response to treatment, a diagnosis, a surgical outcome, and a clinical measurement of a brain.

Embodiment 14 is the method of any one of embodiments 1-13, wherein selecting, based on the indication of the patient outcome of interest, the model from the plurality of models to produce the selected model is based on a predetermined criterion comprising one or more performance parameters of the plurality of models.

Embodiment 15 is the method of embodiment 14, wherein the predetermined criterion comprises an area under a curve (AUC) of a receiver operation characteristic curve (ROC).

Embodiment 16 is the method of embodiment 5, wherein the one or more brain regions comprises one or more of: a name associated with the one or more brain regions; a spatial location of the one or more brain regions relative to a structural landmark of the brain; and one or more parcellations of the brain.

Embodiment 17 is a system comprising: a brain scan standardization engine configured to ingest brain data of interest and standardize the brain data of interest; a brain metadata standardization engine configured to ingest brain metadata assigned to the brain data of interest and convert the brain metadata to a standard form; a model generation engine configured to receive the brain data of interest from the brain scan standardization engine and brain metadata from the brain metadata standardization engine and to generate a plurality of models wherein each model assigns an outcome of interest to the brain data of interest; and a scan engine configured to apply a variety of models to subject specific brain data to identify potential outcomes.

Embodiment 18 is the system of embodiment 17, wherein the brain scan standardizing engine is configured to perform, on the brain data of interest, one or more of: motion correction, distortion correction, standardization across imaging devices, and generation of personalized parcellation data.

Embodiment 19 is the system of any one of embodiments 17-18, wherein the potential outcomes comprises one or more of a disease, a symptom, a brain condition, and a treatment.

Embodiment 20 is the system of any one of embodiments 17-19, wherein the brain data of interest comprises: anatomical information, functional information, or both.

Embodiment 21 the system of any one of embodiments 17-20, wherein the brain metadata standardization engine or the brain scan standardization engine is configured to be queried by a user.

Embodiment 22 is a computer program product, encoded on one or more non-transitory computer storage media, comprising instructions that when executed by one or more computers cause the one or more computers to perform operations comprising: receiving a brain image dataset of a subject; receiving, from a user, an indication of a patient outcome of interest; selecting, based on the indication of a patient outcome of interest, a model from a plurality of models to produce a selected model; determining brain data of interest for the patient outcome of interest; determining, using the selected model, subject specific brain data of interest based on the brain image dataset of the subject and on the brain data of interest; and taking an action based on the subject specific brain data of interest.

Embodiment 23 is one or more non-transitory computer storage media encoded with computer program instructions that when executed by one or more computers cause the one or more computers to perform operations comprising: receiving a brain image dataset of a subject; receiving, from a user, an indication of a patient outcome of interest; selecting, based on the indication of a patient outcome of interest, a model from a plurality of models to produce a selected model; determining brain data of interest for the patient outcome of interest; determining, using the selected model, subject specific brain data of interest based on the brain image dataset of the subject and on the brain data of interest; and taking an action based on the subject specific brain data of interest.

Existing systems or methods that localize brain areas that relate to a disease, symptom, or a clinical measurement can be time consuming, expensive, thereby creating burdens not only for the patient but also for the doctors and medical institutions. Further, operation of the existing methods or systems requires disease-specific experience and knowledge for performing the methods, operating the systems, and/or analyzing the data. The subject matter described in this specification can be implemented in particular embodiments so as to realize numerous advantages over existing systems and methods. For example, the disclosed technologies can provide a technical solution for medical professionals or other users to a technical problem of automatically locating brain regions that are associated with a disease, a symptom, or any other clinically relevant outcome a user may indicate. The disclosed technologies have greatly reduced the requirement of technical or medical experience of the user so that the user can easily enter a clinical outcome of interest and be provided results and/or image(s). The disclosed technologies advantageously provides an interactive, user-friendly graphical user interface (GUI) that facilitates user input of a clinical outcome of interest and visualization of the resulting brain regions in the context of the anatomical structure of the brain. The disclosed technologies advantageously provide automatic standardization of brain images obtained using different parameters, by different imaging modalities, or at various medical institutions so that the machine learning models can be trained with a sufficient volume of standardized training examples. The machine learning models included here can be interpretable so that a user may choose to closely examine decision boundaries, e.g., a specific accuracy level, of the selected machine learning models to explore and/or adjust features that are influential in generating particular results. A model built on images pre-processed by an embodiment of the system can classify target group versus control group with greater than 70% accuracy.

The disclosed technologies can also perform automatic standardization of existing clinical information such as treatment or diagnosis corresponding to brain images, e.g., provided by doctors, so that they can be used as ground truth in the training without adding extra workload to the user or other medical professionals.

The disclosed technologies can process images of the brain and output certain brain regions, e.g., relevant to a brain condition, with convenient customization for visualization by the user. For example, the subject matter herein advantageously allows simultaneous visualization of (i) spatial locations of brain regions relative to anatomical structures in the brain; and (ii) spatial locations of brain regions relative to each other in the brain.

The disclosed technologies can be used to: facilitate patient diagnosis and treatment, guide a surgical procedure; predict an outcome of the surgical procedure, evaluate risk associated with the surgical procedure, select appropriate target(s) in a brain for a therapy, predict response to treatment, study disease progression, and understand the nature of a brain deficit in a subject. For example, the claimed subject matter can help a medical professional find regions or parcellations of a patient's brain that are linked to depression. Such information can be used to perform more focused diagnosis or treatment of depression in the located regions.

The details of one or more variations of the subject matter described herein are set forth in the accompanying drawings and the description below. Other features and advantages of the subject matter described herein will be apparent from the description, drawings, and claims.

BRIEF DESCRIPTION OF THE DRAWINGS

Like reference symbols in various drawings indicate like elements.

DETAILED DESCRIPTION

Existing systems and methods rely on results of multiple tests and various imaging sessions to find brain locations that address a clinical inquiry, such as a symptom. Such traditional methods would be time consuming, expensive and burdensome for clinicians and/or the subject. Systems and methods described in this specification reduce that complexity and requirement for expertise in analyzing test results and interpreting imaging data by standardizing existing medical images and their associated information for training machine learning models. The trained machine learning models can then be selected to automatically map brain regions to the clinical outcome. Such brain regions can be provided to medical professionals for more focused and efficient testing and/or imaging.

Figure 1:
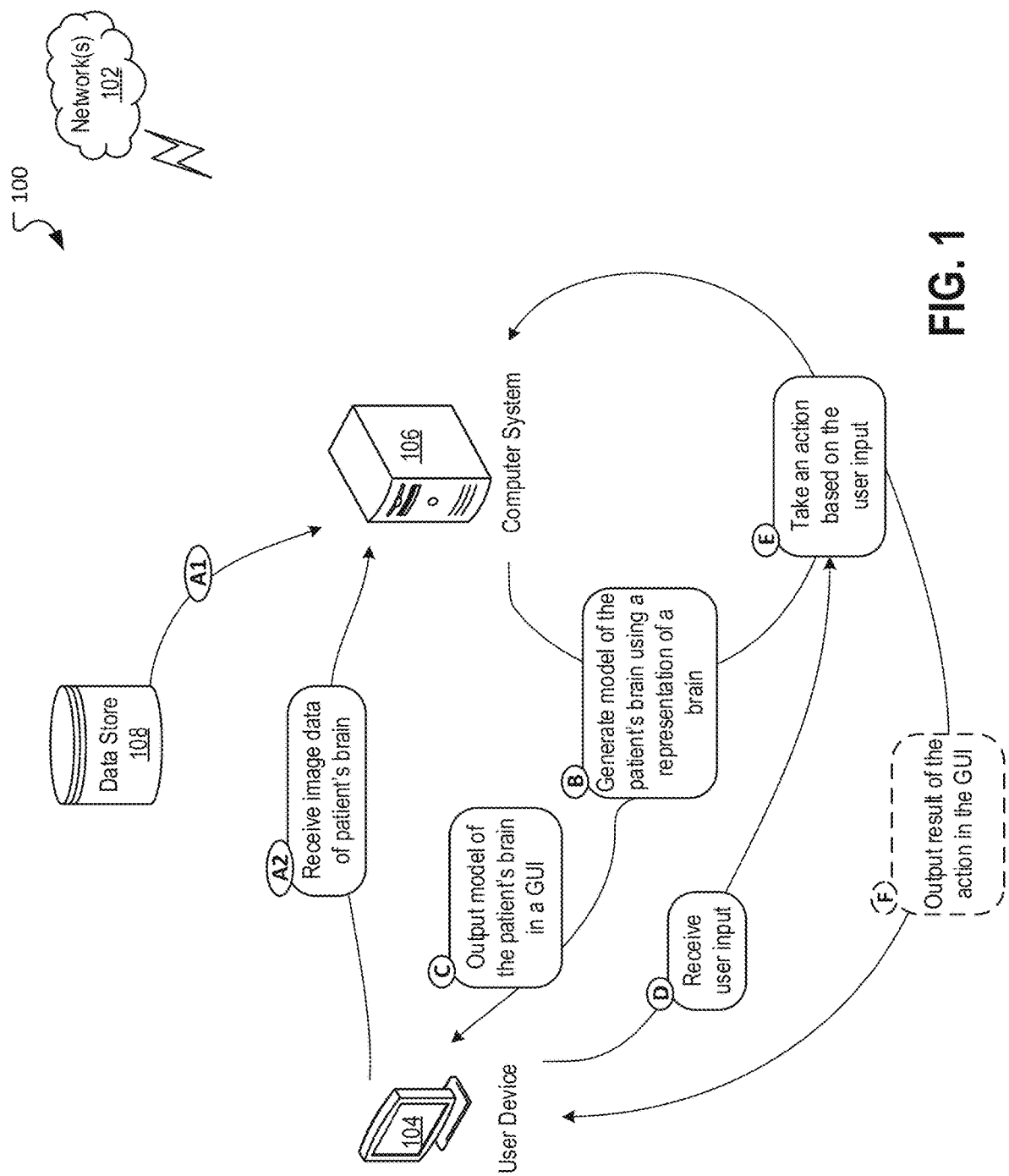
FIG. 1 is a conceptual diagram illustrating a computing environment for finding brain regions that maps to a patient outcome of interest.

FIG. 1 is a schematic diagram illustrating a computing environment 100 for generating a GUI representation of brain data. The computing environment 100 can include a user device 104, a computer system 106, a data store 108, and a medical imaging device 90, which can communicate (e.g., wired and/or wirelessly) via network(s) 102.

The user device 104 can be used by a medical professional, such as a clinician, surgeon, doctor, nurse, researcher, or other professional. The user device 104 and technologies described herein can be used by any other user. The user device 104 can be any one of a computer, laptop, tablet, mobile device, mobile phone, and/or smartphone. Sometimes, the user device 104 can be integrated into or otherwise part of one or more other devices in a medical setting, such as the medical imaging device 90 and/or the computer system 106. The medical professional can use the user device 104 to view information about the brain. For example, using the disclosed technology, the medical professional can view, at the user device 104, three dimensional (3D) representations of the brain and make determinations about what diagnosis, treatment, and/or surgical procedure to perform. The medical professional can also view other/additional information about the particular patient at the user device 104 to make more informed decisions with regards to the particular patient's diagnosis, treatment, surgery, or other medical or research purposes. Thus, the user device 104 can provide hardware that can support the GUIs, software, and applications described herein, such as a singular and interactive brain navigation system that makes it easier and more intuitive for the medical professionals to make medical and research determinations.

The computer system 106 can be a remote computing system, a cloud-based system or service, and/or integrated with or otherwise part of one or more devices in a medical setting (e.g., such as the user device 104 and/or the medical imaging device 90). The computer system 106 can be a computer, processor, a network of computers, a server, and/or a network of servers. Sometimes, each medical setting (e.g. a hospital) can have one or more computer systems 106. Sometimes, the computer system 106 can be used across multiple medical settings (e.g., multiple hospitals). The computer system 106 can be configured to generate interactive representations of patients' brains based on image data of the brains. The computer system 106 can also generate GUIs to display the interactive representations of the brains at the user device 104.

Sometimes, the computer system 106 can clean the image data by removing personally identifying information (e.g., protected health information (PHI)) from that data. Cleaning the image data can be beneficial to preserve patient privacy, especially if the interactive representations of patients' brains are used for medical research, clinical studies, or otherwise are stored in the data store 108 for future retrieval and use. Removing personally identifying information can also be advantageous if the computer system 106 is remote from the user device 104 and the interactive representations of the brain are generated at the computer system 106 that is outside a secure hospital infrastructure or other network where the image data is generated and/or the representations of the brain are displayed. In other words, removing personally identifying information can be advantageous to preserve patient privacy when patient data is communicated between different networks and/or infrastructure.

The data store 108 can be a remote data store, cloud-based, or integrated into or otherwise part of one or more other components in the medical setting (e.g., such as the user device 104 and/or the computer system 106). The data store 108 can store different types of information, including but not limited to image data of patient brains (e.g., from the medical imaging device 110), cleaned image data (e.g., from the computer system 106), data for use in creating 3D representations of patient brains or other interactive representations of patient brains (e.g., from the computer system 106), connectivity data associated with patient brains, determinations, actions, or other user input taken by the medical professional (e.g., at the user device 104), patient information or records, or other relevant information that can be used in a medical setting.

The medical imaging device 110 can be of a variety of devices and/or systems that are used in the medical setting to capture image data of patient brains. The medical imaging device 110 can capture image data that includes but is not limited to x-rays, computed tomography (CT) scans, magnetic resonance imaging data (MRIs), near infrared spectroscopy (NIRS) data, and/or electroencephalography (EEG) data. The computer system 106 can be configured to receive a variety of image data of a brain and generate connectivity data about the brain from that image data to map the data onto a user-friendly interactive representation of the brain.

Figure 2:
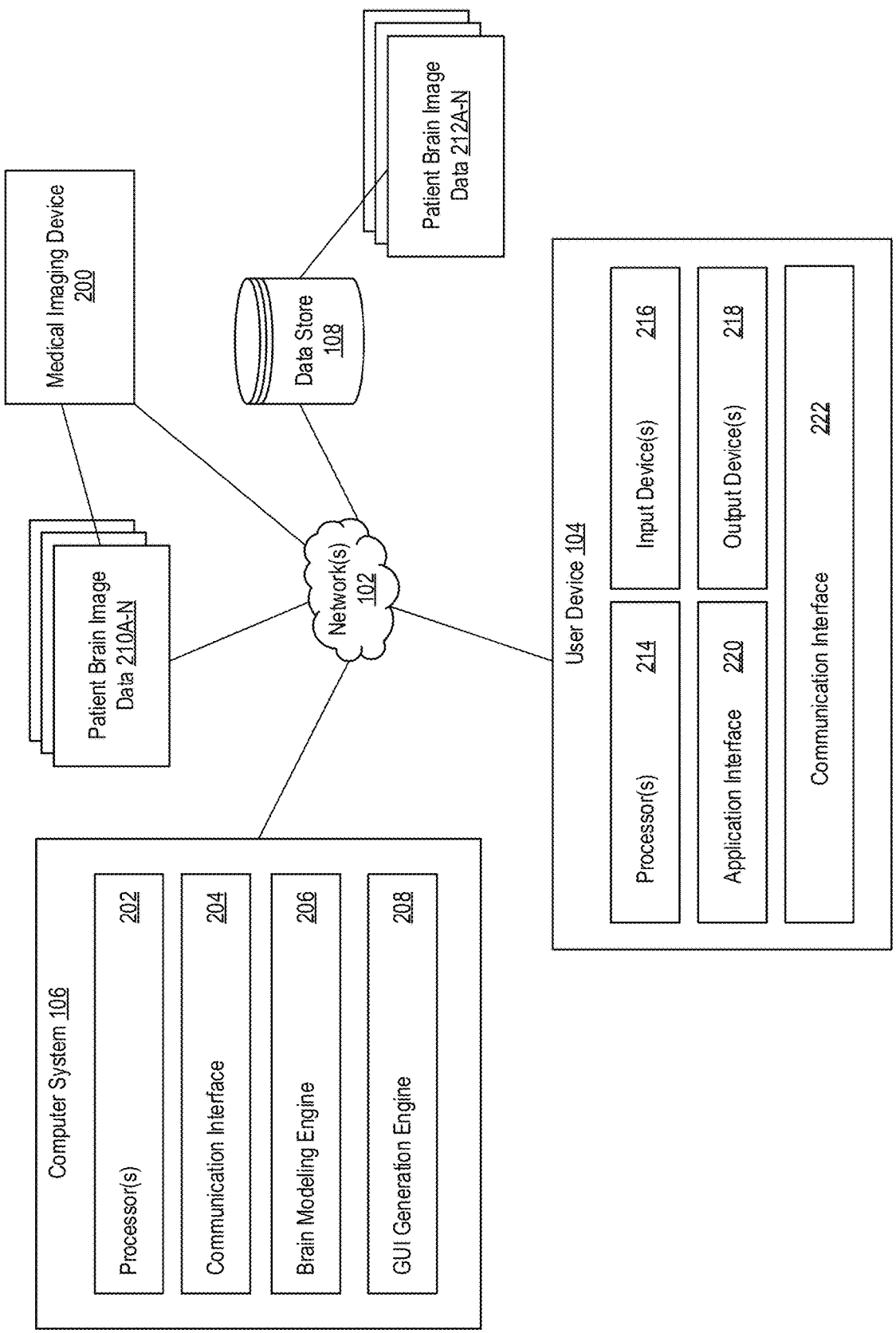
FIG. 2 illustrates components in a computing landscape that can be used to find brain regions that map to a patient outcome of interest

Referring to FIGS. 1 and 2, the computer system 106 can receive image data of the brain from one or more of the data store 108 (step A1), the user device 104 (step A2), and the medical imaging device 200. Sometimes, for example, when the user device 104 is part of the medical imaging device 200, the computer system can receive the image data captured by the medical imaging device 200 from only one device (e.g., the medical imaging device 200 or the user device 104). The image data can be captured by the medical imaging device 200 then sent directly, in real-time, to the computer system 106 for real-time processing. Sometimes, the image data can be captured by the medical imaging device 200, then initially reviewed by the medical professional at the user device 104. Accordingly, the user device 104 can transmit the image data to the computer system 106 (step A2).

In some implementations, image data of multiple different brains can be captured by multiple different medical imaging devices 200. The image data can be stored in the data store 108 for future processing and analysis. The computer system 106 can then retrieve a batch or batches of the image data from the data store 108 and batch process the image data. Batch processing can be advantageous to use fewer computational resources and reduce network bandwidth.

Once the computer system 106 receives the image data (e.g., steps A1-A2), the computer system can generate a model of the brain using a representation of a brain (step B). For example, the computer system 106 can map or model the patient's brain from the image data onto a 3D representation of a brain. The 3D representation can be a generic brain in 3-dimensional or other multi-dimensional space or it can be an anatomical representation of the particular patient's brain. The 3D representation can be a glass brain, e.g., showing 3D anatomical structures derived from medical images with a preset degree of transparency which facilitates superimposing parcellations in their anatomically accurate locations. Mapping the patient's brain onto the glass brain can be advantageous to provide vantage points of different structures, parcellations, and connectivity in the particular patient's brain. A medical professional can more easily analyze the particular patient's brain via the 3D representation of the brain rather than through the raw image data captured by the medical imaging device 110. As a result, the medical professional can generate more informed decisions and determinations with regards to the particular patient's diagnosis, treatment, surgery, condition, or other medical or research purposes.

Once the patient's brain is modeled using the representation of the brain (step B), the computer system 106 can output the model of the patient's brain to a GUI at the user device 104 (step C). For example, the computer system 106 can generate GUI data representing a model of the patient's brain and then transmit the GUI data to the user device 104 to be processed for display. The model can represent the patient's brain overlaid on the glass brain. Sometimes, instead of outputting the model at the user device 104 (step C), the computer system 106 can store the model of the patient's brain in the data store 108. The model of the patient's brain can then be accessed/retrieved at a later time and presented to a medical professional or other user at the user device 104.

As mentioned throughout, when the model of the patient's brain is displayed at the user device 104, the GUI can allow the medical professional to take numerous actions in response to reviewing the model of the patient's brain. For example, the medical professional can determine what type of diagnosis, treatment, or surgical procedures to take with regards to this particular patient. The medical professional can also interact with the model of the patient's brain through user-selectable options and features in the GUI that is displayed at the user device 104. The medical professional can change views of the model of the patient's brain (e.g., rotate around the model or, view only a left or right side of the patient's brain), select portions of the patient's brain from the model (e.g., select a particular lobe, parcellation, group of parcellations, such as a group of parcellations that form a functional network), view other information about the patient (e.g., health records, prior medical visits, etc.), and simulate surgical procedures that can impact different parcellations or portions of the patient's brain. The medical professional can provide input to the user device 104, for example, via an input device, and the input can indicate the medical professional's interaction(s) with the model of the patient's brain. This input can then be received by the computer system 106 (step D).

The computer system 106 can take an action based on the received user input (step E). For example, if the medical professional changes or selects a different view of the model of the patient's brain, then the computer system 106 can generate updated GUI data representing the patient's brain that includes the selected view data. This updated GUI data can be processed for display at the user device (step F). As another example, the medical professional can remove one or more parcellations or other brain regions from the model of the patient's brain. The computer system 106 can receive this input (step D), simulate removal of the user-selected parcellations (step E), then output results of removing such parcellations from the brain at the user device 104 (step F). The medical professional can review the output results and take further actions in response. Further actions can include decisions about what parcellations the medical professional should remove during the actual medical procedure and/or how to proceed with diagnosis and/or treatment (e.g., by planning a medical procedure).

Sometimes, the computer system 106 can take an action based on the user input (step E) that does not also include outputting a result of the action at the user device 104 (step F). For example, the medical professional can input notes about what actions the medical professional intends to take during a medical procedure, a diagnosis for the particular patient, and/or treatment for the patient. The computer system 106 can receive this input and store it in the data store 108 but may not output results from storing this input. This input can then be retrieved from the data store 108 and provided to one or more other devices (e.g., a report can be generated that indicates the patient's diagnosis and treatment). The report can then be provided to a device of the patient. The report can also be transmitted to devices of other medical professionals, such as those in a hospital infrastructure/network). The computer system 106 can take one or more other actions based on the user input (step E) and optionally output results of the action(s) at the user device 104 (step F).

FIG. 2 illustrates components in a computing landscape that can be used to generate data about the brain. As described above, the user device 104, computer system 106, data store 108, and medical imaging device 110 can communicate via the network(s) 102. One or more of the components 104, 106, 108, and 110 can also be integrated into a computing system, network of devices, server, cloud-based service, etc. The network(s) 102 may be a wide-area network (WAN), such as the Internet, a cellular telecommunications network, or a private WAN. Connection via the network(s) 102 can include a traditional dial-up modem, a high-capacity (e.g., cable) connection such as a broadband modem, and/or a wireless modem.

The computer system 106 can include processor(s) 202, communication interface 204, brain modeling engine 206, and GUI generation engine 208. The processor(s) 202 can be configured to perform one or more operations described herein. Although not depicted, the computer system 106 can also include at least one memory unit, which may have semiconductor random access memory (RAM) and semiconductor read only memory (ROM).

One or more of the techniques and processes described herein can be implemented as software application programs executable by the processor(s) 202 in the computer system 106. Moreover, one or more of the techniques and processes described herein can be executed in browsers at remote terminals, systems, or devices (e.g., the user device 104 and/or another computer system), thereby enabling a user of the remote terminals, systems, or devices to access the software application programs that are executing on the computer system 106. For example, steps for any of the techniques and processes described herein can be affected by instructions in the software application programs that are carried out within the computer system 106. Software instructions may be formed as one or more code modules (e.g., using PYTHON or equivalent language modules installed on the computer system 106 and/or the remote terminals, systems, or devices), each for performing one or more particular tasks. The software instructions can also be divided into separate parts. For example, a first part and the corresponding code module(s) can perform the techniques and processes described herein and a second part and the corresponding code module(s) can manage a user interface (e.g., the GUIs described herein) between the first part and the medical professional at the user device 104.

Moreover, the software may be stored in a non-transitory, tangible, computer readable medium, including storage devices described throughout this disclosure. The software can be loaded into the computer system 106 from the computer readable medium, and then executed by the computer system 106. A computer readable medium having such software or computer program recorded on the computer readable medium can be a computer program product. Examples of transitory or non-tangible computer readable transmission media that may also participate in the provision of software, application programs, instructions and/or data include radio or infra-red transmission channels as well as a network connection to another computer or networked device, and the Internet or Intranets, including e-mail transmissions and information recorded on Websites and the like.

Still referring to the computer system 106, the brain modeling engine 206 can be configured to map characteristics of a patient's brain onto a representation of a brain (e.g., refer to step B in FIG. 1). For example, the brain modeling engine 206 can receive patient brain image data 210A-N, which can be used to generate a model of the patient's brain. The patient brain image data 210A-N can be received from the medical imaging device 110. The patient brain image data 210A-N can also be received from the user device 104. In some implementations, as described in reference to FIG. 1, the computer system 106 can retrieve patient brain image data 212A-N from the data store 108. The patient brain image data 212A-N can then be used by the brain modeling engine 206 to model the patient's brain.

Sometimes, modeling the brain can include identifying connectivity data for the particular brain. Modeling the brain can then include mapping the connectivity data over the representation of a generic brain. In yet some implementations, modeling the patient's brain can include identifying parcellations, brain atlas, brain tracts, and other portions of the patient's brain that can be mapped onto the representation of the generic brain. Moreover, the brain modeling engine 206 or a separate personal health information (PHI) extraction module (not shown) can be configured to identify personal information in the image data of the brain and extract that information before mapping the patient's brain onto the representation of the generic brain. The brain modeling engine 206 can use one or more machine learning models to accurately map the particular patient's brain data onto a representation of the generic brain.

In some implementations, for example, Digital Imaging and Communications in Medicine (DICOM) images of a particular brain to be parcellated can be processed by the brain modeling engine 206. DICOM is an international standard for transmitting, storing, retrieving, processing and/or displaying medical imaging information. A registration function for the particular brain can be determined in, for example, a Montreal Neurological Institute (MNI) space (a common coordinate space) described by a set of standard brain data image sets, a registered atlas from a human connectome project can be determined, and diffusion tractography of the DICOM images can be performed to determine a set of whole brain tractography images of the particular brain (in neuroscience, tractography can be thought of as a 3D modeling technique used to represent tracts, e.g., to represent white matter tracts visually). For each voxel in a particular parcellation in the registered atlas, the following method can be performed: determining, using voxel level tractography vectors showing connectivity of a voxel with other voxels in other parcellations; classifying the voxel based on the probability of the voxel being part of the particular parcellation; and repeating determining of the voxel level tractography vectors and classifying the voxels for multiple parcellations, e.g., all parcellations of the human connectome project multi-modal parcellation version 1.0 (HCP-MMP1) Atlas, to form a personalized brain atlas (PB Atlas) containing an adjusted parcellation scheme reflecting the particular brain. The related details are described in U.S. Pat. Nos. 11,055,849 and 11,145,119 and incorporated by reference in their entirety herein.

The GUI generation engine 208 can be configured to generate GUI data for the modeled brain. The GUI generation engine 208 can receive the modeled brain data from the brain modeling engine 206 and generate appropriate GUI data for displaying the modeled brain data to a user, e.g., a medical professional (e.g., refer to FIG. 3). The GUI generation engine 208 can also transmit the generated GUI data to the user device 104 to be processed for display to a medical professional or other user.

Moreover, whenever user input is received from the user device 104 that includes performing some action in response to the output model of the brain, the input can be received by the computer system 106. The brain modeling engine 206 can take some action (e.g., refer to step E in FIG. 1) in response to receiving the user input (e.g., refer to step D in FIG. 1). That action can include, for example, simulating removal of one or more parcellations and/or group(s) of parcellations in the patient's brain. The GUI generation engine 208 can generate updated GUI data based on the actions taken by the brain modeling engine 206 (e.g., refer to step F in FIG. 1). The GUI generation engine 208 can then transmit the updated GUI data to the user device 104 to be processed for display to the medical professional.

Sometimes, one or more of the components of the computer system 106, such as the brain modeling engine 206 and the GUI generation engine 208 can be part of one or more different systems. For example, the brain modeling engine 206 can be part of a software application program that can be loaded and/or executed at another device, such as the user device 104 and/or the medical imaging device 110. As another example, the GUI generation engine 208 can be part of a software application program that is executed at the user device 104 and the brain modeling engine 206 can be executed at the computer system 106 or another remote computing system, server, or cloud-based server or system.

The user device 104 can include processor(s) 214, input device(s) 216, output device(s) 218, application interface 220, and communication interface 222. The processor(s) 214 can be configured to perform one or more operations described herein. Although not depicted, the user device 104 can also include at least one memory unit, which may have semiconductor random access memory (RAM) and semiconductor read only memory (ROM).

The input device(s) 216 and output device(s) 218 can include one or more of an audio-video interface that couples to a video display, speakers, and/or a microphone, keyboard, mouse, scanner, camera, touch screen display, other display screen(s) (e.g., LCDs), joystick, and/or other human interface device. The input device(s) 216 can be configured to receive user input from the medical professional or other user. The output device(s) 218 can be configured to output the model of the patient's brain and/or actions taken by the computer system 106 in response to the user input. The output device(s) 218 can present a variety of GUI displays and information to the medical professional, where such displays and information are generated by the computer system 106. The output device(s) 218 can also output information that is received or otherwise generated by the medical imaging device 110.

The application interface 220 can be executable software or another program that is deployed at the user device 104. The GUI data generated by the computer system 106 can be displayed or otherwise output via the application interface 220. In some implementations, the application interface 220 can be executed at a browser of the user device 104. The medical professional can then access and view the GUIs via the Internet or other connection. Sometimes, the application interface 220 can be executed as a software module/program/product at the user device 104. The application interface 220 can provide the interactive GUIs to the medical professional and receive input from the medical professional (e.g., FIG. 3).

The communication interfaces 204 and 222 can be configured to provide communication between and amongst the components described herein. For example, a communication interface can include a modem.

Figure 3:
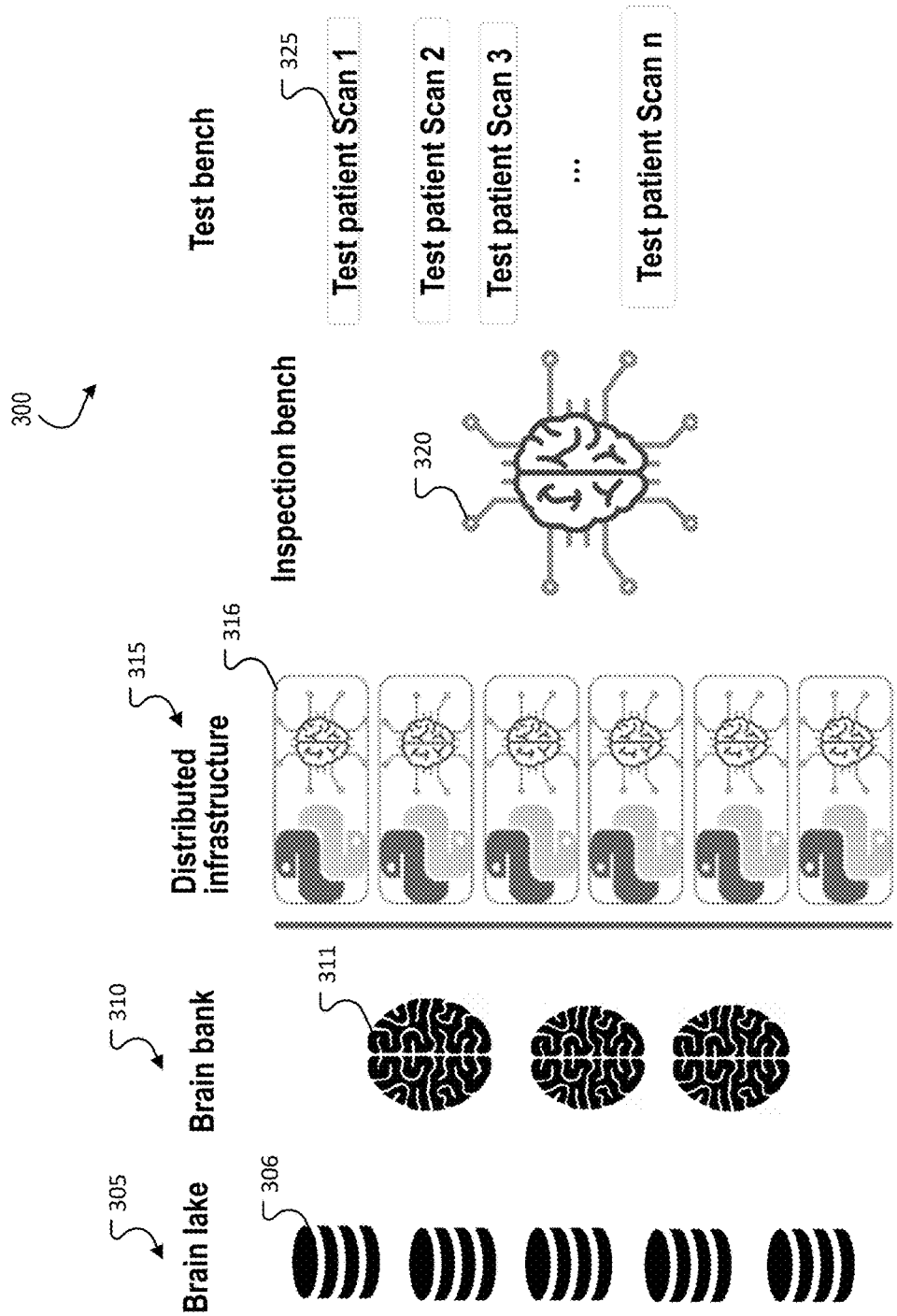
FIG. 3 illustrates an example diagram of the system for finding brain regions that map to a patient outcome of interest.

FIG. 3 is an example system for generating subject specific brain data of interest. The system 300 can be a computer-implemented system that includes one or more computer systems 106, data stores 108, and user devices 104 in FIGS. 1-2. The elements within the system 300 may communicate with each other via a variety of connections, for example, via the network(s) 102 in FIGS. 1-2.

The system 300 may include a brain metadata standardization engine 305. The brain metadata standardization engine 305 may include one or more computer systems 106. The engine 305 can be configured to ingest or otherwise receive brain metadata and convert the brain metadata to a standard format 306. The brain metadata standardization engine 305 may ingest the brain metadata which can be in different format or file type. For example, the brain metadata may include radiologist's handwritten analysis of the brain images. As another example, the brain metadata may include different abbreviations and acronyms. As another example, the brain metadata may include subject information, such as gender, age, country, etc. in different languages or in different fields of the metadata. The engine 305 can extract information from the brain metadata and generate standardized brain metadata. Various technologies can be used for extracting information such as object segmentation, object classification, pattern recognition, and optical character recognition (OCR).

The brain metadata can be associated with a brain image dataset of a subject for which the system 300 is going to make a prediction or inference. The brain metadata can also be associated with brain data of interest, which includes multiple brain datasets from different subjects and/or acquired using different imaging devices.

The brain metadata can include but is not limited to image metadata included in any image data acquired via a medical imaging device. The brain metadata can include various information that is associated with the brain image dataset for which the system 300 is going to make a prediction or inference on or brain data of interest from multiple subjects and/or multiple imaging devices. The brain metadata may include various information that can be obtained from existing medical records of subjects at various medical institutions. For example, the brain metadata can include clinical information such as patient information, patient medical record, diagnosis, treatment history, and symptom (s). As another example, the brain metadata can include clinical evaluation or analysis of the brain images of a subject such as a brain condition, a disease, a symptom, a treatment, or their combinations. The standardized brain metadata 306 may be in a form that is predetermined or customized by a user. The standardized brain metadata can include a list of predetermined names or descriptions of the information and a corresponding value of some or all of the predetermined names or descriptions. As a non-limiting example, the standardized brain metadata may include a description "diagnosis," and the value of such description can be "schizophrenia." As another example, the standardized brain metadata may include a description of "imaging modality," whose value can be "MRI," and a subfield of image modality can be T1, DWI, functional, functional (motor), functional (speech), etc. Such information can be extracted by the standardization engine 305 from the raw brain metadata and put in a standardized form.

The brain metadata standardization engine 305 may ingest brain metadata based on a predetermined schedule or upon receiving a user's indication. Similarly, the brain metadata standardization engine 305 may convert the brain metadata based on a predetermined schedule so that it can utilize computational resources more efficiently. Alternatively, the engine 305 may only convert data whenever an indication or request is received from a user.

The brain metadata standardization engine 305 may store the standardized information 306 in a computer system 106 or a data store 108 so that such information can be retrieved whenever needed. The engine 305 may communicate the standardized information 306 to one or more elements of the system 300. The engine 305 may communicate the standardized information 306 to the brain scan standardization engine 310 and/or the model generation engine.

Figure 4:
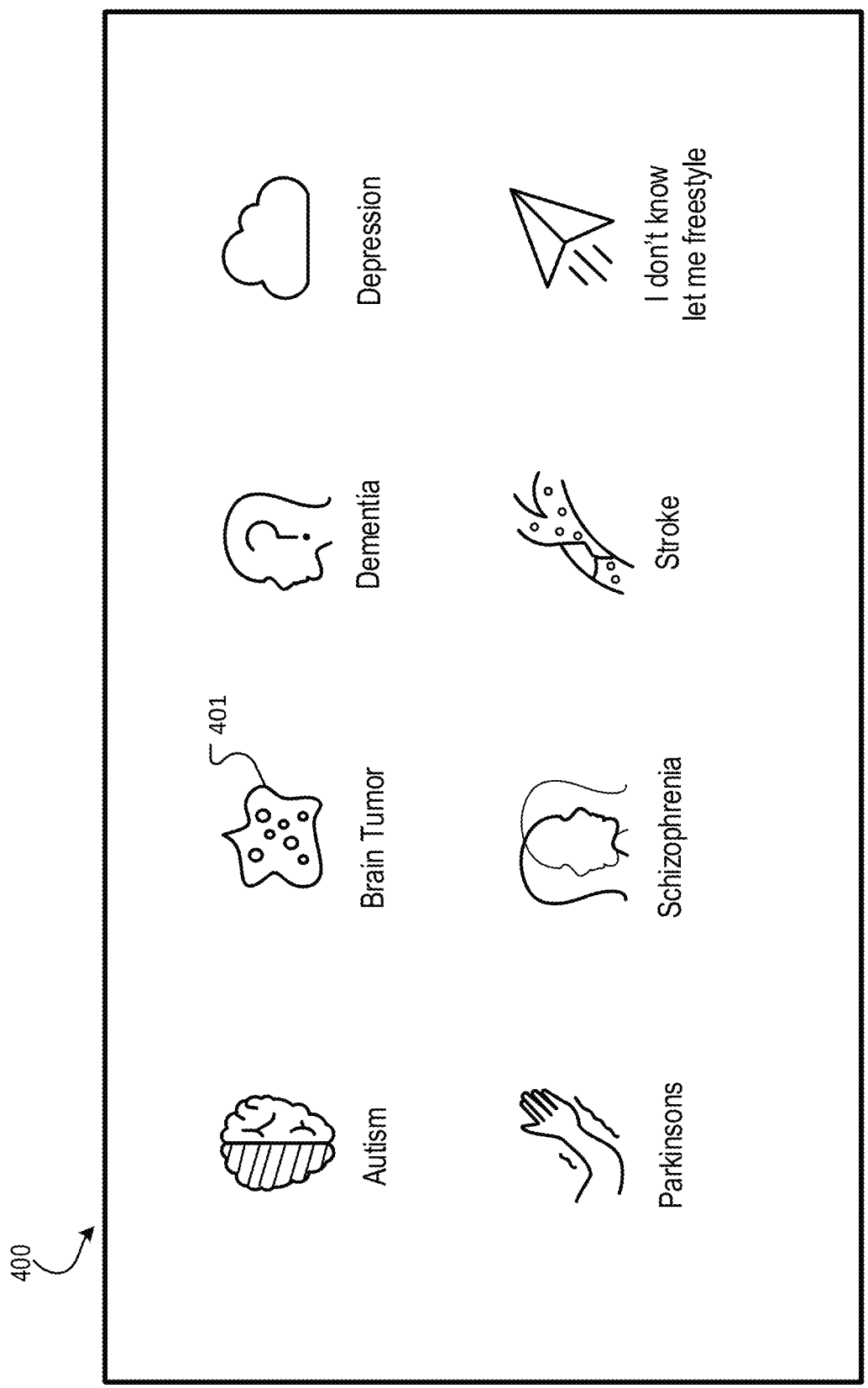
FIG. 4 illustrates an example user-interactive GUI displaying patient outcomes of interest that a user can select.
Figure 5:
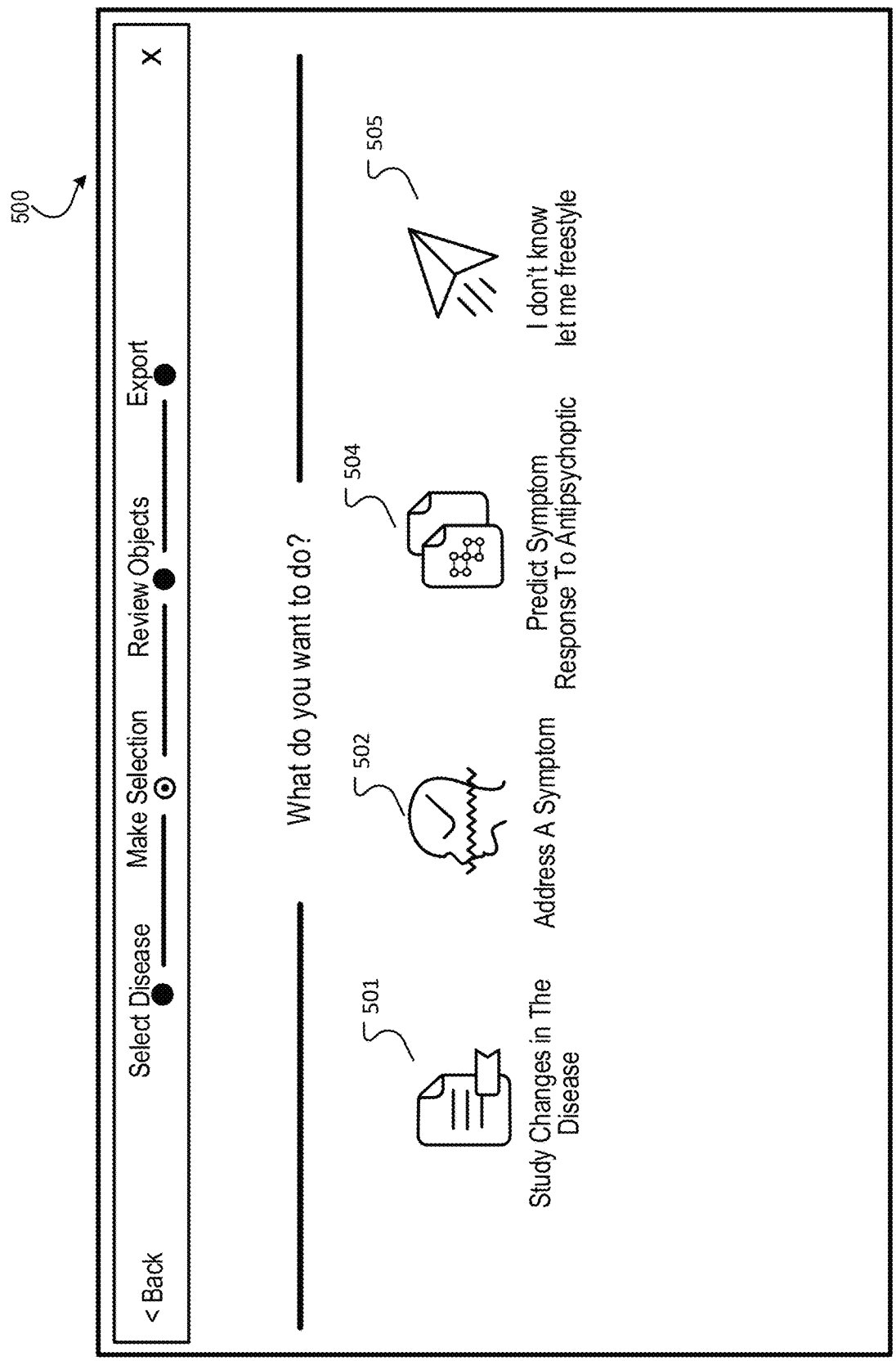
FIG. 5 illustrates an example user-interactive GUI displaying patient outcomes of interest that a user can select.

The brain metadata standardized engine 305 can be queried by a user. For example, a user, optionally without any expertise regarding a specific disease, may query the brain metadata standardized engine 305 by indicating a disease or a symptom of interest, for example, via GUI as shown in FIGS. 4-5. And the brain metadata standardization engine 305 may perform a search based on the user's inquiry to see if the specified disease or symptom of interest matches any existing standardized information or not. The brain metadata standardization engine 305 may return a response to the user's inquiry based on the searching. A user may decide to proceed locating brain region(s) that are linked to the inquiry if the engine 305 can find matching standardized information to the inquiry. Alternative, the system 300 may automatically ingest more data from different medical institutions that have matching information to the user's inquiry.

The system can include a brain scan standardization engine 310. The brain scan standardization engine 310 may include one or more computer systems 106. The engine 310 can be configured to ingest or otherwise receive brain image data and standardize the brain image data.

In some embodiments, the brain scan standardization engine 310 may but is not limited to perform one or more of operations including: registering anatomical information of the brain data of interest to a predetermined coordinate system; registering connectivity information of the brain data of interest to the predetermined coordinate system; standardization across imaging devices, e.g., to eliminate undesired device-specific characters in the image data such as image noises; and correcting artifacts in each of the brain data (e.g. motion and distortion correction). In some embodiments, the brain scan standardization engine 310 may be configured to generate a corresponding brain atlas based on each of the brain data of interest; tractography data based on each of the brain data of interest; brain connectivity data based on each of the brain data of interest; a brain anomaly connectivity matrix based on each of the brain data of interest or a combination thereof.

The brain image data can be existing image data of various subjects across different medical institutions. Such image data can also include image scan(s) of a subject on which the system is going to make an inference or prediction. The brain image data can be associated with brain metadata being processed by the brain metadata standardization engine 305. For example, brain image data and brain metadata may each be associated with a subject identification number, and such identification may be assigned by the system 100. Brain image data and brain metadata can be connected in other ways, e.g., 1) the meta data is available "with the scan at ingestion" (e.g., the subject can fill in scales in a survey and the survey results can be attached to the subjects image file) in which case the metadata is based on relevant rules, e.g., survey questions; and/or 2) a subject's scan can be routed to a specific metadata standardization engine based on priorities derived through unsupervised learning.

The brain image data ingested by the engine 310 can include but is not limited to image data acquired via a medical imaging device. The brain image data can be brain anatomical data, brain functional data, brain structural data, and/or data derived therefrom.

The brain image data can be acquired with different imaging parameters, such as image resolution, field of view, signal to noise, rotation, and orientation. For example, the brain image data can include a same patient before and after a surgical procedure or treatment. As another example, the brain image data can be a patient imaged using different imaging modalities, or a same imaging modality, but with different magnetic fields or different field of view.

The brain scan standardization engine 310 is configured to ingest brain image data and generate standardized brain image data 311 using a variety of standardization techniques. At least a portion of the standardized brain image data 311 may have been processed from "raw" image data acquired at the medical imaging device(s) 110. The standardization may include processing of the "raw" image data, e.g., segmentation, registration, generating histogram(s), interpolation, and filtering. The standardization may include but is not limited to motion correction, artifact removal, distortion correction, image registration into a predetermined coordinate system, adjustment of the field of view, adjustment of image resolution, normalization of image signals, and adjustment of signal-to-noise ratio. In some cases, standardization could also include removal of imaging site and/or image scanner specific effects. The details of some brain image standardization techniques are included in U.S. application Ser. Nos. 17/494,800 and 17/337,365 and incorporated by reference in its entirety herein. Standardization can also include the extraction of latent features that can be used to derive a transformation function from one scan to another.

Optionally after pre-processing of the "raw" image data, the engine 310 may also be configured to feed the pre-processed image data into predetermined process(es) that generate one or more of: a personalized brain atlas, brain fiber tract data, brain connectivity data, a brain anomaly connectivity matrix, and brain parcellation data. The size of a brain connectivity matrix can have more than 100 elements, 500 elements, 1000, or 10,000 elements. For example, a brain anomaly connectivity matrix can have 128 columns by 128 rows and a total of 16,384 elements. The related details of generating the anomaly connectivity data is disclosed in U.S. Pat. No. 11,087,877 and incorporated by reference in its entirety herein.

The standardized brain image data 311 can include a 3D representation of the brain. Such representation can be generated from any type of medical imaging data that is indicative of anatomical information of the brain. The standardized brain image data 311 can include anatomical data of some or all parts of the brain.

The standardized brain image data 311 may include parcellation data for some or all parts of the brain. The parcellation data may include, for one or more parcellations, a parcellation ID, a parcellation label, and MNI space coordinates, or their combinations.

The standardized brain image data 311 may include connectivity data in some or all parts of the brain. For each of one or more pairs of locations within the brain of a patient, the connectivity data may indicate the degree to which brain activity in the pair of locations, e.g., parcellations, is correlated. The standardized brain image data 311 may include anomaly connectivity data in some or all parts of the brain, which identifies one or more pairs of parcellations whose correlation is anomalous. For example, if the degree of correlation of activity for a pair of parcellations has a distribution of values over a set of subjects, than a particular correlation can be determined to be anomalous if it is more than a predetermined threshold away from, e.g., more than a standard deviation away from, the mean of the distribution.

The standardized brain image data 311 may include anomaly correlation data, which identifies one or more regions of the brain of the patient for which the brain data was anomalous. For example, the brain data can include one or more of blood-oxygen-level-dependent imaging data, fMRI data, or EEG data captured from the brain of the patient.

The brain scan standardization engine 310 is configured to resolve missing data with one or more predetermined methods. The predetermined method may be selected by the user or automatically determined by the brain scan standardization engine based on the nature of the missing data. For example, if several pixels in an image are affected by artifacts, the brain scan standardization engine may replace the pixel values with the average of its nearest neighbors. If missing pixels are at the edges of an image and does not include any information of the brain, the pixels may be filled with zero or such pixels may be removed from the image. The system may include a model generation engine that is configured to receive the brain data of interest from the brain scan standardization engine 310 and brain metadata from the brain scan metadata standardization engine 305 after they have been standardized by the engines 305, 310.

A non-limiting example of pseudo code of the brain scan standardization engine 310 and the brain metadata standardized engine 305 is:

```
"""
Pseudocode for automated ML
"""
import pickle
from pathlib import Path
import nibabel as nib
import DashboardApp as app
from common import constants
from common import visualisation_tools as vt
from modules import OMNIProcessor, hots
"""
```

-continued 1. a brain metadata standardization engine
Configured to ingest brain metadata assigned to the brain data
of interest and convert the brain metadata to a standard form
"""
```
import pandas as pd
import numpy as np
from bbetl.common.transformation_helper import ETLLoad
class dataset_name_ETLLoad(ETLLoad):
    short_name = 'dataset_name'
    acquisition_country = 'usa'
    license_key = 3
    marketing_key = 0
    def prepare_files(self):
        # TODO any step between identifying the files and filtering/renaming
        s3path = fs3://brain-bank/{self.short_name}/readme/sourcetables/participants.tsv'
        files_to_read = [
            {'path': s3path, 'sep': '\t', 'target': 'patient_data'}
        ]
        self.files_df = pd.DataFrame(files_to_read)
        return
    def apply_adjustment(self):
        """
        Apply individual adjustments to dfs on a case by case basis - Keep out of abstract base class
        """
        result = [ ]
        dfs_to_concat =[ ]
        map_sex = {'M':'male','F': 'female'}
        map_dx = {'no condition':'control'}
        for read_file_dict in self.cleaned_files:
            df = read_file_dict['df']
            file = read_file_dict['file']
            df['original_id'] = 'sub-' +df['original_id'].astype(str)
            df['age'] = df['age'] + df['age_months']/12
            df = df.drop(columns = ['age_months'])
            df['handedness'] = [ 'left' if k <0 else 'right' for k in df['handedness_score'] ]
            df['sex']=df['sex'].replace(map_sex)
            df['dx']=df['dx'].str.lower( ).str.replace(map_dx). str.replace(" ", "_")
            df = df.applymap(lambda s:s.lower( ) if type(s) == str else s)
            result.append(dict(file = file,df = df))
            dfs_to_concat.append(df)
        self.concat_dfs = pd.concat(dfs_to_concat)
        self.cleaned_files = result
            return
    if __name__ == '__main__':
        etl = dataset_name_ETLLoad( )
        etl.prepared_files = etl.prepare_files( )
        etl.read_data( )
        etl.clean_data( )
        etl.apply_mappings( )
        etl.apply_adjustment( )
        etl.apply_linting( )
        etl.create_subject_table( )
        etl.send_to_db(subject_df-etl.subject_table, event_df-etl.measurements_table, dataset=etl.short_name)
"""
2.1 a brain scan standardization engine (part 1: ingestion standardisation)
Configured to ingest brain data of interest
and standardize the brain data of interest
"""
from bbetl.common.imaging_etl_toolbox import imagingETL
from tqdm import tqdm
#Dataset as it comes is fairly close to our bids format, only some small changes required
    class dataset_name_imagingETL(imagingETL):
        short_name = 'dataset_name'
        s3_root = "s3://brain-bank/"
        def bidsify(self):
            for file in tqdm(self.all_files):
                sub_id = 'sub-' +str(file.split('/')[3])
                ses_id =+str(file.split('/')[4])
                # Check filetype based on mapping in image mapping JSON
                filetypes = self.series_mapping.keys( )
                modality = None
                for series_type in filetypes:
                    inclusion_terms = self.series_mapping.get(series_type).get('inclusion')
                    exclusion_terms = self.series_mapping.get(series_type).get('exclusion')
                    if any(inclusion_term in file for inclusion_term in inclusion_terms):
```

```
                if not any(exclusion_term in file for exclusion_term in exclusion_terms):
                    modality = series_type
                    break
            if '.nii.gz' in file:
                ext = 'nii.gz'
            else:
                ext = file.split('.')[-1]
            if modality == 't1':
                bids_fname = f"anat/{sub_id}_{ses_id}_run-1_T1w.{ext}"
            elif modality == 'dwi':
                bids_fname = f"dwi/{sub_id}_{ses_id}_run-1_dwi.{ext}"
            elif modality == 'lr_rest1':
                bids_fname = f"func/{sub_id}_{ses_id}_task-restLR_run-1_bold.{ext}"
            elif modality == 'lr_rest2':
                bids_fname = f"func/{sub_id}_{ses_id}_task-restLR_run-2_bold.{ext}"
            elif modality == 'rl_rest1':
                bids_fname = f"func/{sub_id}_{ses_id}_task-restRL_run-1_bold.{ext}"
            elif modality == 'rl_rest2':
                bids_fname = f"func/{sub_id}_{ses_id}_task-restRL_run-2_bold.{ext}"
            elif modality == 'func_motor':
                bids_fname = f"func/{sub_id}_{ses_id}_task-motor_run-1_bold.{ext}"
            elif modality == 'func_speech':
                bids_fname = f"func/{sub_id}_{ses_id}_task-speech_run-1_bold.{ext}"
            else:
                fname = file.split('/')[-1]
                bids_fname = f"other/{fname}"
            sourcedir = self.s3_root + file
            destdir= self.s3_root + f'{self.short_name}/rawdata/{sub_id}/{ses_id}/{bids_fname}'
            self.utility.aws_move(sourcedir,destdir,dryrun=False,copy=True)
        return
    if __name__ == '__main__'
        im_etl = dataset_name_imagingETL()
        im_etl.bidsify()
"""
2.2 a brain scan standardization engine (part 2: processing standardisation)
Process through Omniscient processing pipeline to generate standardised brain data
- registering anatomical information of the brain data of interest to a pre-determined
coordinate system;
- registering connectivity information of the brain data of interest to the pre-
determined coordinate system;
- standardization across imaging devices;
- correcting artifacts in each of the brain data of interest (e.g. motion & distortion
correction)
generating one or more of;
- a corresponding brain atlas based on each of the brain data of interest;
- tractography data based on each of the brain data of interest;
- brain connectivity data;
- a brain anomaly connectivity matrix
or a combination thereof.
"""
# Load data
data_path = Path('../sample_data/')
anat_img = nib.load(data_path / 'input_t1.nii.gz')
dwi_img = nib.load(data_path / 'input_dwi.nii.gz')
bold_img = nib.load(data_path / 'input_bold.nii.gz')
# Set parameters
processing_params = {
    "anat_image": anat_img,
    "dwi_image": dwi_img,
    "bold_image": bold_img,
    "harmonisation": True,
    "motion_correction": True,
    "distortion_correction": True,
    "remove_artifacts": True,
    "denoising": True,
    "persist_derivs_path": Path('./'),
}
omni_processor = OMNIProcessor(**processing_params)
omni_processor.run()
```

The model generation engine can then utilize the standardized brain metadata 306 and standardized brain image data 311 to generate a plurality of models 316. Each model can assign an outcome of interest to the brain data of interest. Such outcome may include an inference or prediction related to a clinical outcome. Such inference or prediction may also include a degree of uncertainty associated with the inference.

The model generation can be based on the indication of the patient outcome of interest. For example, when the indication of the patient outcome of interest is schizophrenia, and in particular, what parcellations of the patient may be related to schizophrenia symptoms, the model generation engine may select binary classification models which are capable of predicting which parcellation(s) are likely to be responsible for causing schizophrenia symptoms.

In some embodiments, the model generation engine may allow a user to enter preliminary information that can be used for model selection. For example, by default, the model generation engine may select models that are binary classifiers. But, the model generation engine may provide a prompt to a user, e.g., via a GUI, such as "if binary is not correct outcome type, please manually select the outcome type as 'multiclass' or 'regression.'"

Alternatively, the model generation engine may select one or more models from a pool of existing models based on various model parameters, including but not limited to model type, hyper parameter, structure, computational complexity, and performance. For example, model selection can be based on optimization criteria noted above, e.g., model selection can select models that can distinguish target group from control group with greater than 70% accuracy. Generally, model selection will be based on the model's performance towards answering the patient outcome of interest. Different models may perform better pertaining to different patient outcomes of interest, both because of the type and quantity of data relevant to that patient outcome, as well as the inherent characteristics of the data. For example, the model generation engine may select a first model for a depression related problem (which may rely on many thousands of functional features) but a different second model for a dementia related problem, which may lean on drastically different data (such as a handful of atrophy related features).

The model generation engine may compare and/or assess which model(s) are best suited for problems based on the relevant evaluation metrics for those models, such as, an area under a curve (AUC) of a receiver operation characteristic curve (ROC), accuracy, precision, recall, etc. Additionally, as mentioned herein, the user may have additional criteria for the model—for example explainability. This may also influence the model selection process since it may eliminate certain models where predictions are difficult to explain and attribute to certain features of the brain data. In some embodiments, the model generation engine may select one or more models before the model(s) has been trained. In alternative embodiments, the model generation engine may select one or more models after the model has been trained, for example, using training data corresponding to a patient outcome of interest. In some embodiments, one or more of the existing models may have been tagged with information related to some exemplary clinical outcomes that it can be used for. For example, a model can be tagged as interpretable, so that it can be selected when it is desired to look at the output or decision boundaries during prediction/training for customized adjustment of the model. The user may customize the model selection process by making indications via the GUI. Such user indications may be used to overwrite or fine tune default automatic model selection by the system 300. For example, the user may select 3, 4, 5 or more models rather than just one for comparing model predictions.

The patient outcome of interest can be indicated by a user, e.g., via a GUI. The outcome can be related to information contained in the standardized brain metadata 311. The outcome of interest can be any measurement of a subject or any outcome that is of clinical or research relevance. For example, the outcome can be a symptom, a disease, a treatment, a response to treatment, or a surgical procedure. FIG. 4 shows some exemplary diseases 401 as patient outcomes of interest that a user may enter, for example, via the GUI 400. If a user wants to inquire about outcomes other than the preset diseases 401, the user may select "let me freestyle" to manually input information of the desired outcome.

The user may also indicate, via interaction with the GUI 500, aspect(s) related to the outcome that he or she is interested in. For example, the user may be interested in progression in a disease 501, what diseases a symptom may indicate 502, predicting symptoms of a disease 504, or entering customized inquiry 505.

The system 300 can utilize the patient outcome entered by the user to find corresponding information in the standardized brain metadata. For example, if the user enters "brain tumor," the system may find the standardized brain metadata that contains various brain tumor types and the brain image data labeled with the various brain tumor types. The system may also use other terms relevant to "brain tumor" such as "lump," "mass," "benign," and "malignant," for finding matching information in standardized brain metadata.

The model generation engine can separate the standardized brain image data 311 into at least two classes with respect to an indication of a patient outcome of interest. Such patient outcomes can be included in the standardized brain metadata 306. For example, the patient outcome of interest can be "glioma." The standardized brain metadata 306 may include an existing diagnosis of glioma in some of the subjects. The brain image data associated with such diagnosis will be classified as "glioma," and the brain image data of other subjects can be classified as controls, when there is affirmative information included, or otherwise "unknown." Such brain image data 306, information related to the outcome and extracted from the brain metadata 311 can be used to train a plurality of models 316 generated by the model generation engine. The classification information can be used as ground truth for training the models. Other outcomes of interest, e.g., emotional states such as sadness, can be studied in this way.

The model(s) 316 can be a machine learning model or algorithm. For example, a model can be a classification model or a classifier. The model can be a binary classifier so that it may classify a subject, an image, a brain region, or brain parcellation(s) with respect to an outcome or inquiry. For example, the model may classify a group of parcellations as related or unrelated to a brain symptom. As another example, the model may classify a region as related to a brain tumor with a degree of uncertainty.

The model(s) 316 can be a supervised or unsupervised learning model. When it is supervised, the model 316 can use information included in the standardized brain metadata to label the brain image data to create ground truths for training. The model can be a regressor or a gradient boosting tree. The model can be an interpretable model so that a user may look at the output or decision boundaries during training and interpret the output or decision boundaries for adjustment in model training. The model can be an ensemble model that uses bagging, stacking, and/or boosting of more than one base model.

The model(s) 316 can be trained by using various data splitting methods such as k-fold. The model 316 can be trained by using hyper-parameter tuning. The model 316 can be trained using feature generation based on the standardized image data and metadata. For example, for each patient or subject, a selected model may generate thousands, tens of thousands, or even more features from the subject's brain image dataset that can be utilized during model training or making inferences. During training, each model can be trained with image datasets collected from a large number of subjects, e.g., in the range from a hundred to tens of thousands of subjects. The system 300 can include a scan engine 315 that utilizes the plurality of models 316 generated by the model generation engine. The scan engine 315, or alternatively, the model generation engine, can select a model from the plurality of models to be applied on the brain image dataset of a subject for generating subject specific brain data of interest. The selection can be based on a predetermined selection criterion. The selection criterion can include performance parameters of the plurality of models such as accuracy, training time, or computational complexity. As an example, the selection criterion comprises a threshold for an area under a curve (AUC) of a receiver operation characteristic curve (ROC). The selection criterion can include various model parameters, including but not limited to model type, hyper parameter, structure, computational complexity, and performance.

The selected model or a couple of selected models can be used to predict subject specific brain data of interest. The brain image dataset of the subject and the brain data of interest can be provided to the selected model as input, and the selected model can provide inference or prediction and/or generate the subject brain data of interest.

The system 300 may include an inspection engine 320 that may allow a user to examine model training or model inference processes. The inspection engine 320 may include one or more computer systems 106. The user inspection engine may automatically provide information during model training or model prediction processes to a user, e.g., via a GUI. For example, the inspection engine may return information related to fitting or convergence of a model so that a user can know if over-fitting or other undesired events may have occurred. As another example, for interpretable models, the inspection engine 320 can allow a user to review intermediate prediction output or decision boundaries for fine tuning the model parameters of the selected model or update the selected model(s).

The system 300 may optionally include a test bench 325. The test bench 325 is configured to test one or more models herein and provide the user with testing results. The test results can be indicative of model performance in predicting a particular patient outcome of interest, for example, a specific brain dysfunction that was added to a set of conditions that the system can analyze.

Figure 6:
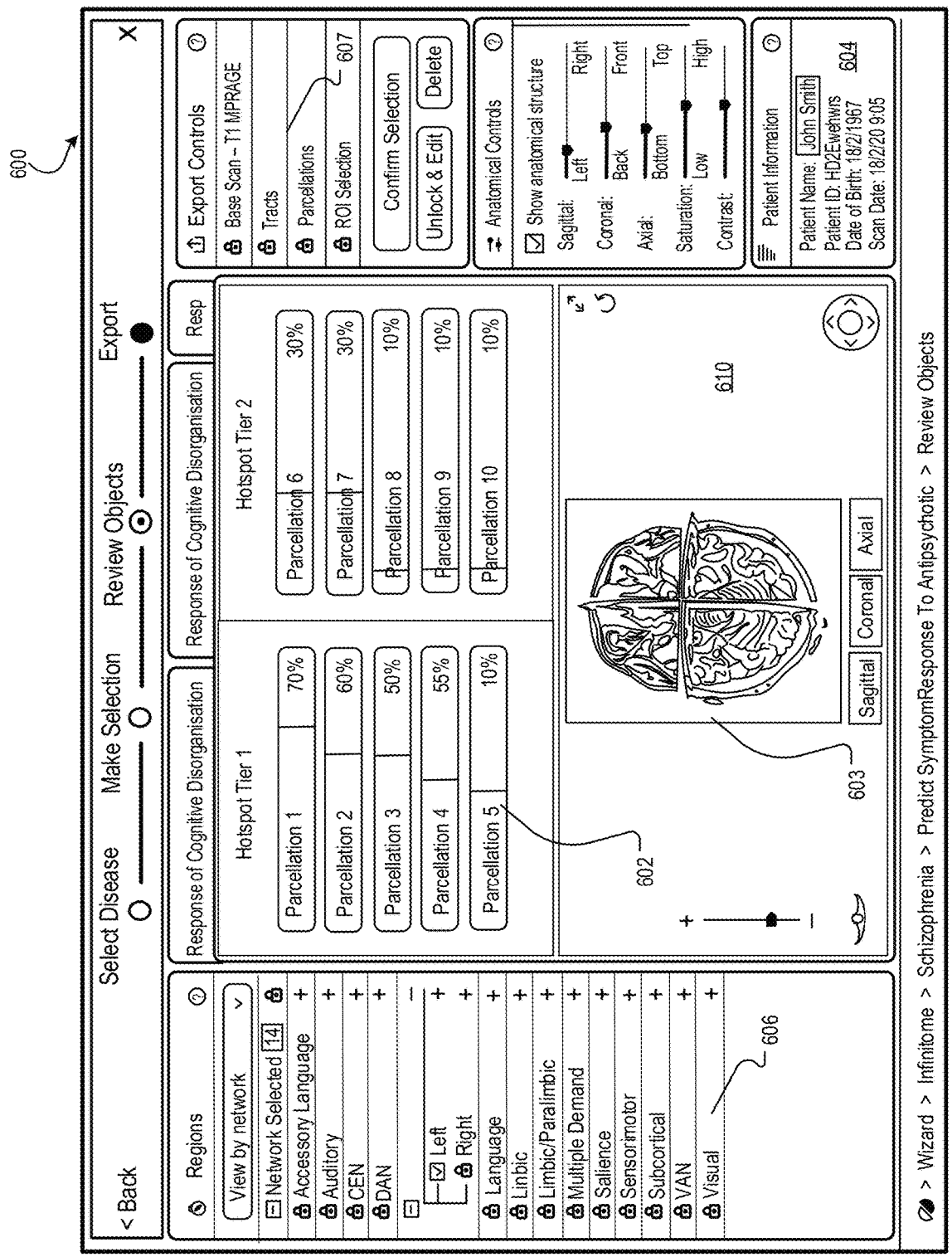
FIG. 6 illustrates an example user-interactive GUI displaying subject specific brain image data that is associated with a patient outcome of interest.

FIG. 6 shows exemplary subject specific brain data of interest. The subject specific brain data of interest can be displayed to a user via a GUI 600 at a user's computer 104.

The GUI 600 displays subject specific brain data of interest within a data display window 610. The subject specific brain data may be forwarded to a user device 104 by a server or another computer, e.g., the computer system 106 in FIG. 1. The subject specific brain data may include inference data 602, subject information 604, and selectable options 606-607. The patient information 604 can include but is not limited to age, gender, brain disease, treatment, and symptom(s). The patient information 604 can include various information included in the standardized brain metadata 306 in association with the subject.

The inference data 602 can be presented to a user together with a 3D representation of the brain 603. Such representation can be generated from any type of medical imaging data that is indicative of anatomical information of the brain. The 3D representation of the brain may be obtained from the standardized brain image dataset of the subject. The inference data 602 can include anatomical data of some or all parts of the brain.

The inference data 602 may include parcellation data that may be visualized as hotspots superimposed on the anatomical information 603. The parcellation data may include, for one or more parcellations, a parcellation ID, a parcellation label, and MNI space coordinates. The parcellation label and the parcellation ID can each be used as a unique identifier of the parcellation. Each parcellation may represent some predefined collection of brain tissue(s). A parcellation can include a single voxel in medical images or a group of voxels. When there are multiple parcellations in a group, they may or may not be spatially connected with one or more parcellations within the same group. In some cases, each parcellation may be visually represented using a size or shape that corresponds to the number of voxels or the size of brain tissues within it. For example, a parcellation represented by a bigger circle in the GUI indicates it is a parcellation with more voxels or tissues than a smaller circle representing another parcellation. In alternative cases, each parcellation may be visually represented by a uniform size and/or shape.

The inference data 602 may also include a prediction value associated with one or more of the parcellations. For example, parcellation 1 has the highest prediction value, e.g., 70%, among all 10 parcellations shown via GUI 600. The prediction value may have different meaning depending on the model selected and the indication of clinical outcome of interest. As a non-limiting example, it may indicate parcellation 1 has a 70% chance of being related to a disease or symptom. And its anatomical location can be viewed in the 3D representation of the brain (not shown) in relation to other parcellations. The details of parcel percentage and visualization are disclosed in U.S. application Ser. No. 17/521,687 and incorporated by reference in its entirety herein.

Referring again to FIG. 6, the user, e.g., a medical professional, may interact with the inference data 602, the anatomical data 603, and the selectable options 606-607 of the GUI 600. The selectable options 606-607 can be positioned around the data display window 610 of the GUI 600.

Although a brain image is useful, a user can benefit more if they have additional information about components of the brain that is imaged. This additional information can be advantageous for the user to make more informed decisions with regard to diagnosis, treatment (such as a medical procedure), and research. Accordingly, as shown in FIG. 6, the GUI 600 can provide the user with tools (e.g., such as the selectable options 606 607) that allow the user to interact with the inference data 602. The user can provide input for selecting portions of the inference data 602 to be displayed. The selected portions can be objects, e.g. brain parcellations, about which the medical professional desires to see more information. The user may also desire to identify and specify, on the GUI 600, particular features, such as local properties of brain tissue, parcellation parameters, structural markers, and functional markers. The disclosed technology therefore can provide the user with a more comprehensive, interactive, and user-friendly interface for making determinations about a particular brain's condition(s).

The user can use the selectable options 606-607 to specify particular actions (e.g. by making selections in the GUI 600 presented at the user device 104 via an input device) with regards to the inference data 602. For example, the user can select to visualize left, right, or both sides of the brain for anatomical information, functional information and/or prediction information. As another example, the user can select to visualize only specified functional, structural and/or parcellation data.

The user can also choose options to export the inference data 602, for example, using an available network. The user can save the exported data (e.g., in the data store 108 in FIG. 1), which can be used in future research and analysis.

The GUI 600 presents only some options that may be presented to the user with regards to the inference data 602. One or more other options are also possible and can be presented in the GUI 600 and/or in additional GUIs that are displayed at the user device 104.

Moreover, as described herein, the GUI 600 can be part of a specialized computing system in the hospital IT infrastructure. Sometimes, the GUI 600 can also be accessible via a web browser. The GUI 600 may be configured, e.g. by authentication mechanisms, to be used by only authorized individuals, such as clinicians (e.g. doctors, nurses, or clinical staff), other medical professionals, or other authorized users (e.g. network administrator, or technical staff) at the hospital or other medical setting. In some implementations, the GUI 600 can also be in communication with or otherwise linked to one or more external devices, such as remote computers, that can be used to facilitate brain surgery or other medical procedures.

Figure 7:
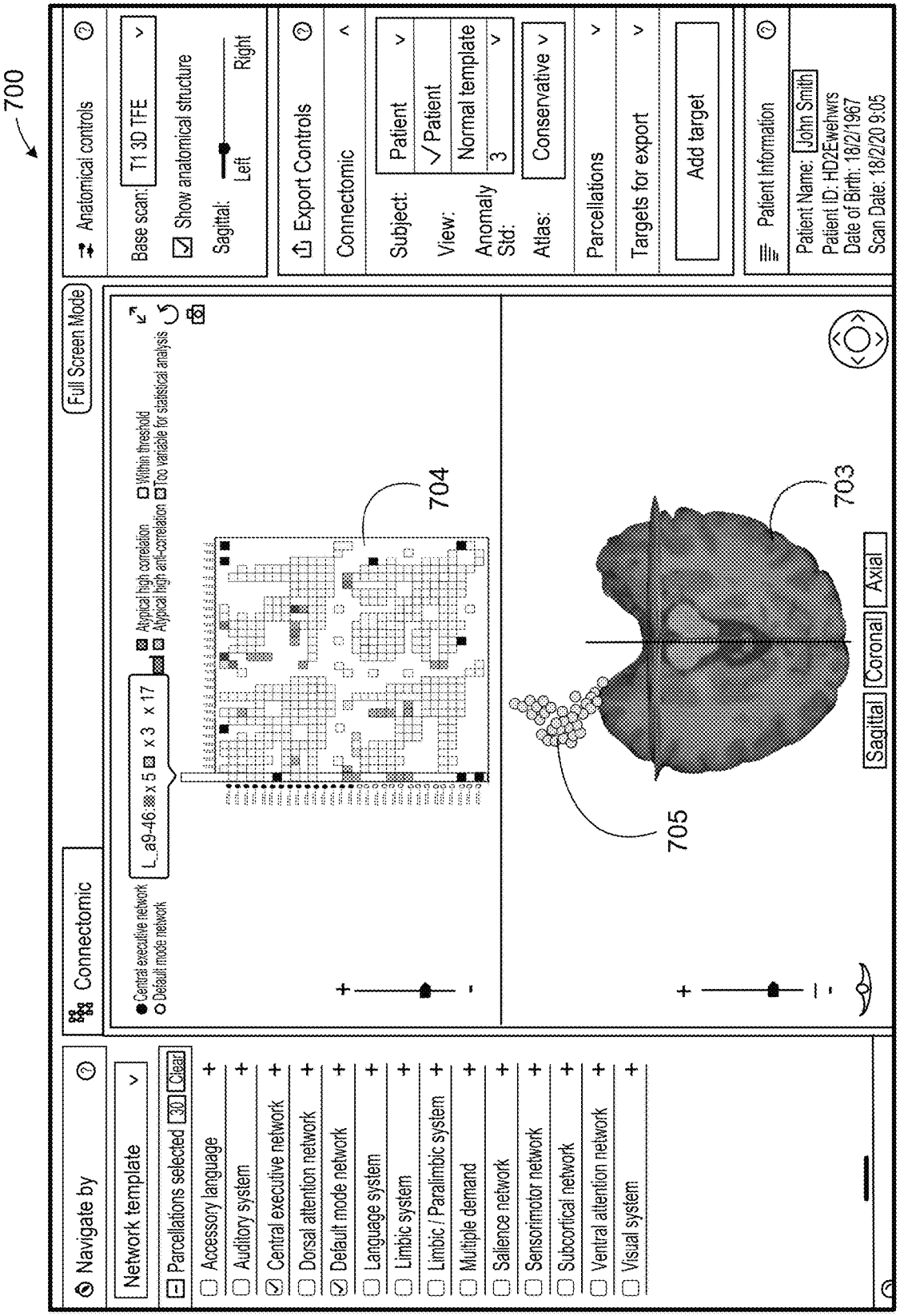
FIG. 7 illustrates an example user-interactive GUI displaying subject specific brain data of interest.

FIG. 7 shows an exemplary embodiment of the subject specific brain data of interest that is output by the selected model. The subject specific brain data of interest can be displayed to a user via a GUI 700 at a user's computer 104. The subject specific brain data may include inference data.

The inference data can include a 3D representation of the brain 703. The inference data can include anatomical data of some or all parts of the brain. The inference data may include brain connectivity data 704, such as a connectivity matrix. Brain connectivity data 704 may indicate, for each of one or more pairs of locations within the brain, the degree to which brain activity in the pair of locations is correlated. For any given element of a connectivity matrix, the row represents a first parcellation, the column represents a second parcellation, and the value of the element is the degree of correlation. In other words, the degree of correlation of brain connectivity is shown at the row and column of the matrix. The value indicative of degree of correlation (or the degree of correlation relative to the mean correlation for a specified population) can be represented by different colors or grayscale.

The inference data may include anomalous connectivity data 704 which indicates one or more pairs of parcellations for which the degree of correlation of brain activity in the pair of locations is abnormal from a predetermined value or range.

The inference data may include parcellation data, and the parcellation data may be visualized as hotspots superimposed on the anatomical information 703. The parcellation data may include some or all of the parcellations included in the connectivity data. For example, the parcellation data shown as hotspots 705 on the 3D anatomical information 703 can be parcellation pairs included in the anomalous connectivity data, which have anomalous connectivity correlation between two parcellations within a pair.

As an example, when a user enters Parkinson as a patient outcome of interest, the computer system determines brain connectivity data or anomalous brain connectivity data 704 as relevant data of interest to Parkinson. The selected model can be trained on connectivity data of Parkinson's patients and control subjects. The trained model can then be used to predict subject specific connectivity data 704 which may include anomaly connectivity that may be linked to Parkinson in the subject. Such subject specific anomaly connectivity data 704 can be shown as a specified grayscale or color in the connectivity matrix 704 and/or hotspots 705 superimposed on the 3D anatomical information.

Figure 8:
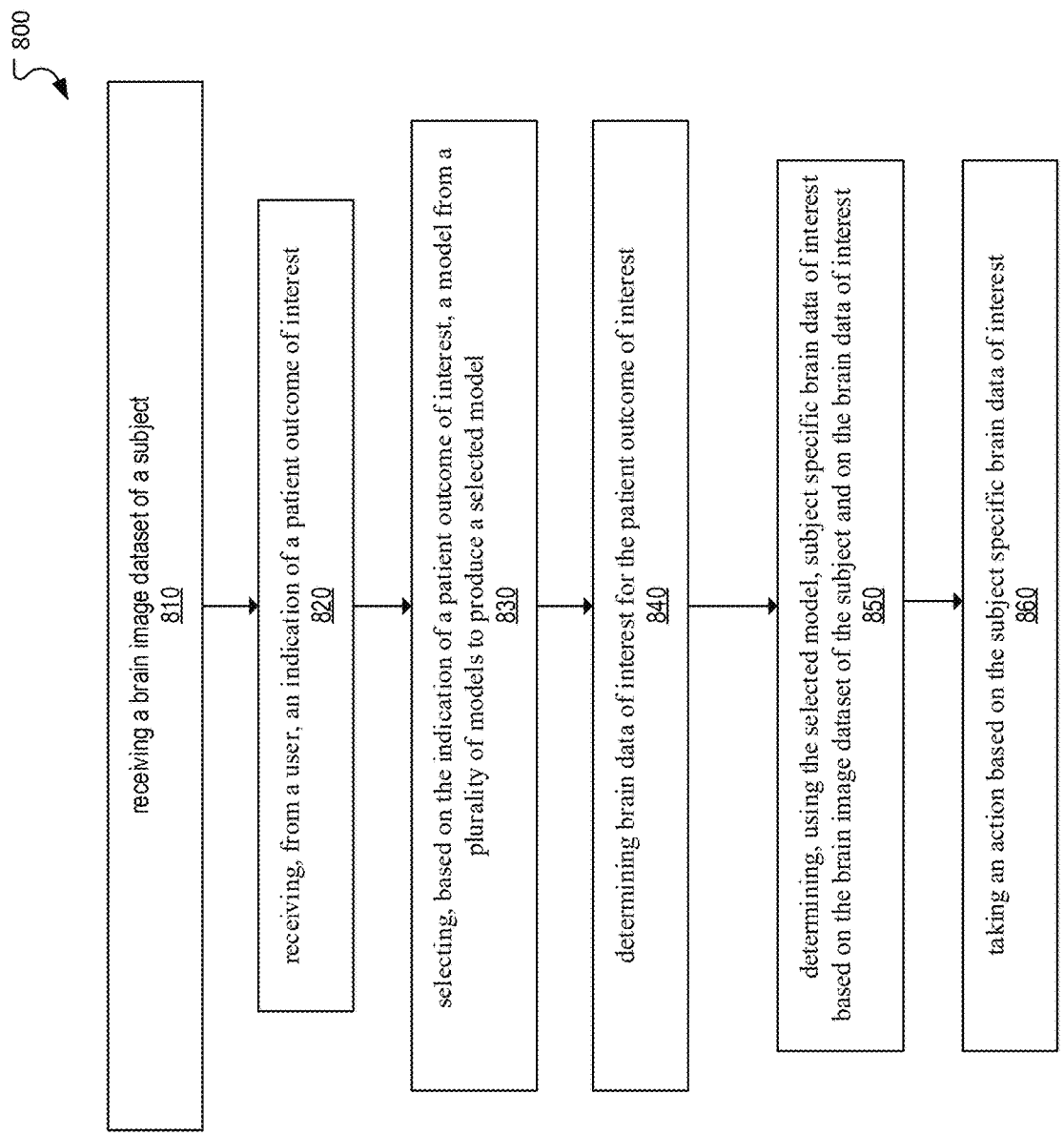
FIG. 8 illustrates an example process for finding brain regions that are associated with a clinical outcome using machine learning models.

FIG. 8 shows an example process 800 of determining subject specific brain data of interest using a selected model. The operations in FIG. 8 may be performed by the computer system 106 in FIGS. 1-2.

The computer system may receive one or more brain image dataset of a subject 810. Such dataset can be received from another computer or memory device such as the data store 108 in FIGS. 1-2. The brain image dataset can include some or all portions of the brain of the subject. The brain image dataset may include images acquired using different imaging modalities or same imaging modality but different parameters. For example, the brain image dataset may include functional magnetic resonance imaging (fMRI) and diffusion tensor imaging (DTI) images. DTI uses magnetic resonance images to measure diffusion of water in a human brain. One can use the measured diffusion to generate tractography data, which can include images of neural tracts and corresponding white matter fibers of the subject brain. The brain image dataset can include medical images such as one or more of blood-oxygen-level-dependent imaging data, fMRI data, MRI data, EEG data, or tractography data.

The brain image dataset can include anatomical or structural data of the brain of the subject. The anatomical data can include one or more brain images, either raw or processed. The anatomical data can include a glass brain.

The brain image dataset may include parcellation data of some or all portions of the subject's brain. The parcellation data can be spatially registered relative to anatomical data of the same brain. The registration can be performed by the computer system 106 in FIGS. 1-2. The brain image dataset may include connectivity data or anomaly connectivity data of some or all portions of the subject's brain.

The computer system can receive an indication from a user of a patient outcome of interest 820. Such indication may be received from a user's computer or another computer system. The indication may be provided by the user via a GUI and communicated to the computer system via the internet.

The patient outcome of interest can be clinically relevant. For example, the patient outcome of interest can be but is not limited to a disease, a symptom, or a treatment. The patient outcome of interest can include response to one or more treatments, a diagnosis, or various measurements on a patient. FIGS. 4-5 show exemplary preset patient outcomes of interest that a user may select via the GUI. Alternatively, a user may choose to manually enter the patient outcome of interest.

Based on the user's indication of the patient outcome of interest, the computer system can automatically select one or more models from a plurality of models 830. For example, if the user's indication of the patient outcome of interest is whether the subject has autism or not. The computer system can select a classification model or a classifier that has been trained using control subjects and autism patients for making a prediction or inference.

The computer system can automatically select one or more models from a plurality of models 830 based on a predetermined selection criterion. The selection criterion can include performance parameters. For example, such performance parameters can include model prediction accuracy, training time, or computational complexity. As another example, the selection criterion comprises a threshold for an area under a curve (AUC) of a receiver operation characteristic curve (ROC).

The computer system can select from machine learning model(s) or algorithm(s). The selected model can be a classification model or a classifier. For example, the model may classify a subject, an image, a brain region, or brain parcellation(s) with respect to the outcome or inquiry. As another example, the model may classify a region as related to a brain tumor with a degree of uncertainty. The model can be a binary or multi-class classification model, or a regression model.

The model can be a supervised or unsupervised learning model. When it is supervised, the model can use information included in the standardized brain metadata to label ground truth brain image data for training. The model can be a regressor or a gradient boosting tree. The model can include support vector machine (SVM), random forest, extra trees algorithm, and/or k-nearest neighbors (KNN). The model can be an interpretable model so that a user may look at the output or decision boundaries during training and interpret the output or decision boundaries for adjustment in model training.

The computer system may determine brain data of interest for the patient outcome of interest 840. This operation may be performed before or after selecting the model 830. This operation may be performed before or after standardization of the brain data of interest.

The computer system may determine the brain data of interest by selecting a subset of subjects and/or patients whose standardized metadata include information matching or is related to the patient outcome of interest. For example, if the patient outcome of interest is brain tumor, brain data of interest can be determined as brain scans and brain metadata which include information such as various types of brain tumors.

The brain data of interest can include brain data from a plurality of control subjects and patients. Such brain data of interest may include existing brain image data that can be obtained from various medical institutions and information associated with such brain image data, such as brain metadata.

The brain data of interest can include brain image data. The brain image data can be brain anatomical data, brain functional data, or their combination. The brain image data can be acquired with different imaging parameters, such as image resolution, field of view, signal to noise rotation, orientation. For example, the brain image data can include MRI images of a same patient before and after a surgical procedure or treatment. As another example, the brain image data can include DTI images of a patient with different magnetic fields or field of view.

The brain data of interest can include a large volume of data that may not be handled manually, e.g., including more than 1000 2D brain images and information associated therewith. For example, medical images of a person's brain may include multiple 2D images to cover a 3D region of the brain. Each 2D image can be 128 by 128 pixels, 256 by 256 pixels, 1024 by 1024 pixels, or of various different sizes. Each 2D image may include a thickness of 0.5 mm, so 10, 50, or 100 2D brain images are needed to cover a 3D brain region. Further, the brain data of interest can include such 3D brain image data from a plurality of control subjects and/or patients from various medical institutions, which makes the volume of data 10 times, 100 times, or 1000 times of a single 3D brain image.

The computer system may standardize the brain data of interest before or after determining the brain data of interest 840.

The brain data of interest, e.g., including the standardized brain image data and brain metadata, may be used to train some or all of the plurality of models, and the selected model may be among the models being trained. Alternatively, the brain data of interest may be used to train only the selected model(s). The computer system, or another computing device, can then use the brain data of interest to train the selected model(s). Information matching, or related to, patient outcome may be used as ground truth data for training a model, where the model reveals the potential presence of a condition for a new patient based on the new patient's brain image data (and potentially based on the new patient's brain image metadata).

In response to determining that the selected model(s) is trained successfully on the brain data of interest, the selected model(s) can then be used on the brain image dataset of the subject to determine subject specific brain data of interest 850 by making inference or prediction.

Alternatively, in response to determining that one or more models are trained on the brain data of interest, the computer system can select a model based on the indication of the patient outcome of interest as disclosed herein, and also based on the training result(s) of the models. As an example, based on one or more evaluation metrics of the model during training (e.g. the area under a curve (AUC) of a receiver operation characteristic curve (ROC)), a certain model with a better AUCROC may get favored over one with worse performance. Other factors that can affect model selection in certain embodiments include: 1) where the outcome of interest is known and the model is selected based on the known outcome of interest (e.g., selecting a depression model where the outcome of interest is depression); and 2) if the outcome of interest is unknown, the system can run a battery of models and highlight those that are problematic.

The computer system may use the trained model to determine the subject specific brain data of interest 850. Such subject specific data may include information of locations in the brain that can be associated with the patient outcome of interest.

The subject specific brain data of interest may include parcellation data as shown in FIG. 6. Such parcellation data include one or more parcellations that may be linked to the patient outcome of interest, and the parcellations can be registered in 3D relative to the anatomical structure of the brain. The subject specific brain data of interest may include connectivity data, e.g., anomaly connectivity matrix as shown in FIG. 7. And the anomalous parcellation pairs can be indicated relative to the anatomical information of the brain.

The computer system can take an action based on the subject specific brain data of interest 860. Such action can include forwarding the subject specific brain data of interest to a user's computer for display, for example, as shown in FIGS. 6-7. Such action may include upon receiving an indication from a user, exporting at least a portion of the subject specific brain data of interest. The data may be exported to other computing devices, such as a data store 108 or a terminal device at a medical institution. The subject specific brain data of interest, e.g., locations in the brain that can be associated with the patent outcome of interest, can be used by medical professionals for more focused examination and/or analysis. For example, a doctor may prescribe further imaging or testing of the associated locations for the subject to examine dysfunction or abnormalities in the locations. As other examples, the subject specific brain data of interest can also be used by medical professionals for consideration when planning brain surgery, planning TMS, or determining treatment and/or behavioral therapies.

A typical brain has about 86 billion neurons. A Blood Oxygenation Level Dependent (BOLD) image recording of the brain includes about 4.3 billion data points for a relatively low resolution image and takes several hundreds of iterations of thousands of parameters and including thousands of subjects each to produce a model for a single outcome of interest. The system comprises of several dozens of outcomes. Furthermore, in certain embodiments, the system selects subject data of interest in near real-time (e.g., in less than a minute, less than 30 seconds, less than 10 seconds, or less than 5 seconds) or in real-time, e.g., in less than 3 seconds, in less than a second, less than ½ of a second, or less than 0.1 seconds.

Figure 9:
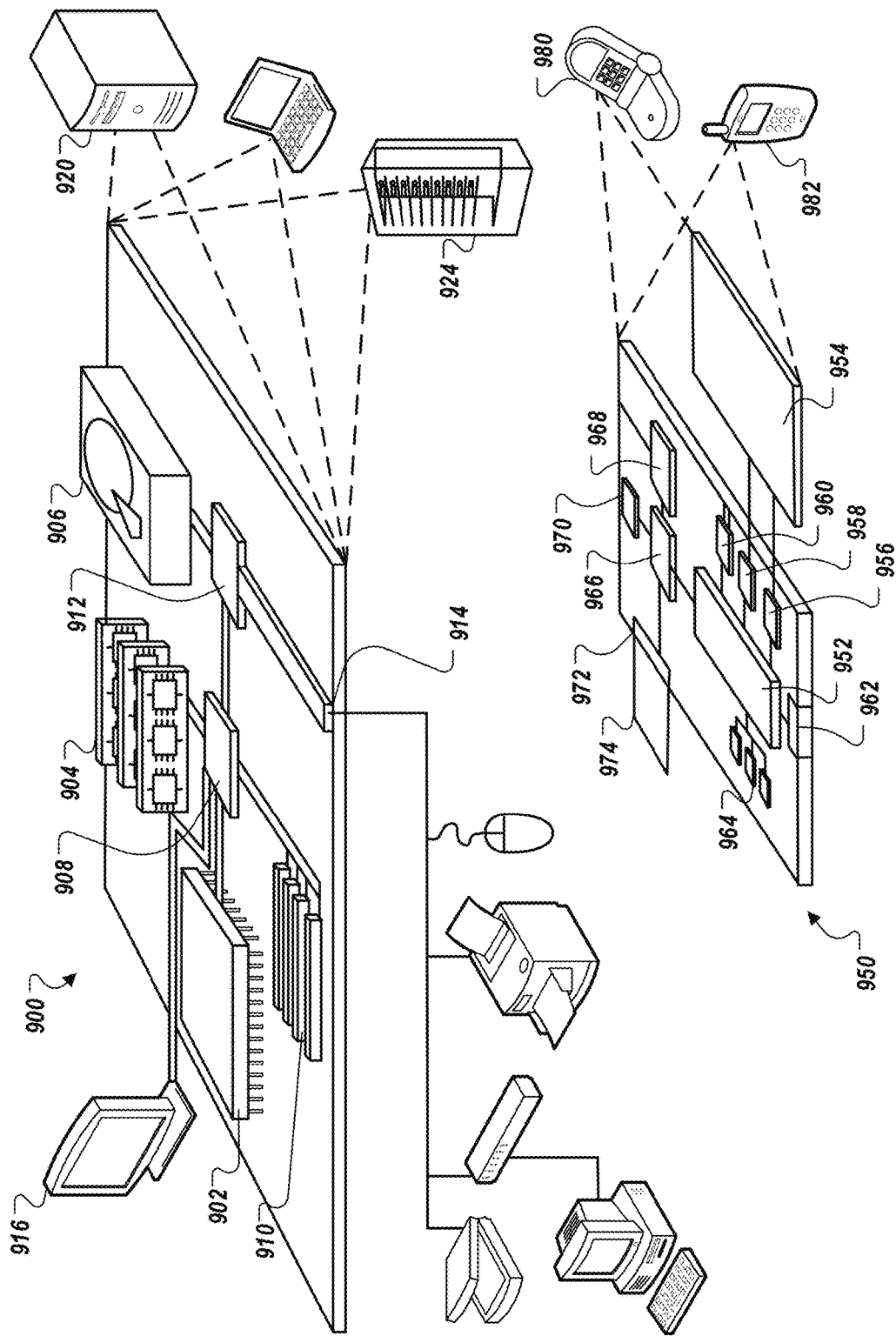
FIG. 9 is a schematic diagram that shows an example of a computing device and a mobile computing device.

FIG. 9 shows an example of a computing device 900 and an example of a mobile computing device that can be used to implement the techniques described here. The computing device 900 can be the computer system 106 or user device 104 in FIGS. 1-2. The computing device 900 can be various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones 980, smart-phones, and other similar computing devices 982. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multiprocessor system).

The memory 904 stores information within the computing device 900. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 612 manages lower bandwidth-intensive operations. Such allocation of functions is exemplary only.

The computing device 900 can be implemented in a number of different forms. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components, e.g., 970. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard 972 or in other manners as appropriate.

The processor 952 can execute instructions within the mobile computing device 950, including instructions stored in the memory 964. The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other. In some implementations, the computing system can be cloud based and/or centrally processing data. In such cases, anonymous input and output data can be stored for further analysis. In a cloud based and/or processing center set-up, compared to distributed processing, it can be easier to ensure data quality, and accomplish maintenance and updates to the calculation engine, compliance to data privacy regulations and/or troubleshooting.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving a brain image dataset of a subject;
receiving, from a user, an indication of a patient outcome of interest;
selecting, based on the indication of a patient outcome of interest, a model from a plurality of models to produce a selected model;
determining brain data of interest for the patient outcome of interest;
determining, using the selected model, subject specific brain data of interest based on the brain image dataset of the subject and on the brain data of interest, wherein the selected model is trained with the brain data of interest and clinical information associated with the brain data of interest comprising a mapping ground truth that maps one or more training regions to a training indication; and
taking an action based on the subject specific brain data of interest.

2. The method of claim 1, wherein receiving, from the user, the indication of the patient outcome of interest comprises receiving the indication of a medical condition.

3. The method of claim 1 further comprising:
providing, to the user, a list of candidates to allow the user to make the indication of the patient outcome of interest, the list of candidates include: studying changes in a condition; addressing a symptom; and predicting response to a specified treatment.

4. The method of claim 1, wherein the brain data of interest comprises: parcellation data; brain connectivity data; brain activity data; anomalous connectivity data; or a combination thereof.

5. The method of claim 1, wherein determining the subject specific brain data of interest based on the brain image dataset of the subject and on the brain data of interest comprises:
locating one or more brain regions of the subject that map to the indication by using the selected model on the brain image dataset of the subject.

6. The method of claim 5, wherein locating one or more brain regions of the subject that map to the indication by using the selected model on the brain image dataset of the subject:
locating the one or more brain regions that map to the indication by using the selected model on a standardized brain image dataset.

7. The method of claim 5, wherein the one or more brain regions comprises one or more of: a name associated with the one or more brain regions; a spatial location of the one or more brain regions relative to a structural landmark of the brain; and one or more parcellations of the brain.

8. The method of claim 1 further comprises generating a standardized brain image dataset based on the brain image dataset of the subject.

9. The method of claim 1 further comprising standardizing the brain data of interest.

10. The method of claim 9, wherein standardizing the brain data of interest comprises:
registering anatomical information of the brain data of interest to a predetermined coordinate system;
registering connectivity information of the brain data of interest to the predetermined coordinate system;
generating a corresponding brain atlas based on each of the brain data of interest;
generating tractography data based on each of the brain data of interest;
correcting artifacts in each of the brain data of interest; or a combination thereof.

11. The method of claim 1, wherein taking the action based on the subject specific brain data of interest comprises forwarding the subject specific brain data of interest to a user's computer for display.

12. The method of claim 11, wherein taking the action based on the subject specific brain data of interest comprises receiving an indication to export at least a portion of the subject specific brain data of interest.

13. The method of claim 1, wherein the indication of the patient outcome of interest comprises one or more of: a disease, a symptom, a response to treatment, a diagnosis, a surgical outcome, and a clinical measurement of a brain.

14. The method of claim 1, wherein selecting, based on the indication of the patient outcome of interest, the model from the plurality of models to produce the selected model is based on a predetermined criterion comprising one or more performance parameters of the plurality of models.

15. The method of claim 14, wherein the predetermined criterion comprises an area under a curve (AUC) of a receiver operation characteristic curve (ROC).

16. The method of claim 1, wherein the brain data of interest comprises existing brain images and information associated therewith of a plurality of control subjects, patients, or both.

17. A system comprising:
one or more computers and one or more storage devices on which are stored instructions that are operable, when executed by the one or more computers, to cause the one or more computers to perform operations comprising:
receiving a brain image dataset of a subject;
receiving, from a user, an indication of a patient outcome of interest;
selecting, based on the indication of a patient outcome of interest, a model from a plurality of models to produce a selected model;
determining brain data of interest for the patient outcome of interest;
determining, using the selected model, subject specific brain data of interest based on the brain image dataset of the subject and on the brain data of interest, wherein the selected model is trained with the brain data of interest and clinical information associated with the brain data of interest comprising a mapping ground truth that maps one or more training regions to a training indication; and
taking an action based on the subject specific brain data of interest.

18. One or more non-transitory computer storage media encoded with computer program instructions that when executed by one or more computers cause the one or more computers to perform operations comprising:
receiving a brain image dataset of a subject;
receiving, from a user, an indication of a patient outcome of interest;
selecting, based on the indication of a patient outcome of interest, a model from a plurality of models to produce a selected model;
determining brain data of interest for the patient outcome of interest;

determining, using the selected model, subject specific brain data of interest based on the brain image dataset of the subject and on the brain data of interest, wherein the selected model is trained with the brain data of interest and clinical information associated with the brain data of interest comprising a mapping ground truth that maps one or more training regions to a training indication; and taking an action based on the subject specific brain data of interest.

* * * * *